(12) United States Patent
Matsui et al.

(10) Patent No.: US 8,821,039 B2
(45) Date of Patent: Sep. 2, 2014

(54) OPTICAL TRANSCEIVER HAVING OPTICAL RECEPTACLE ARRANGED DIAGONALLY TO LONGITUDINAL AXIS

(75) Inventors: Takashi Matsui, Yokohama (JP);
Hiromi Kurashima, Yokohama (JP);
Kazushige Oki, Yokohama (JP);
Naoyuki Fukushima, Yokohama (JP);
Kenichiro Uchida, Yokohama (JP)

(73) Assignees: Sumitomo Electric Industries, Ltd., Osaka-shi (JP); Sumitomo Electric Device Innovations, Inc., Yokohama-shi (JP)

( * ) Notice: Subject to any disclaimer, the term of this patent is extended or adjusted under 35 U.S.C. 154(b) by 275 days.

(21) Appl. No.: 13/432,556

(22) Filed: Mar. 28, 2012

(65) Prior Publication Data
US 2012/0237223 A1    Sep. 20, 2012

Related U.S. Application Data

(63) Continuation-in-part of application No. 12/916,080, filed on Oct. 29, 2010, now Pat. No. 8,376,634.

(60) Provisional application No. 61/261,105, filed on Nov. 13, 2009, provisional application No. 61/314,801, filed on Mar. 17, 2010.

(30) Foreign Application Priority Data

| Oct. 29, 2009 | (JP) | 2009-248592 |
| Mar. 31, 2010 | (JP) | 2010-083610 |
| Apr. 30, 2010 | (JP) | 2010-105557 |
| Apr. 30, 2010 | (JP) | 2010-105560 |
| May 18, 2010 | (JP) | 2010-114311 |
| Sep. 24, 2010 | (JP) | 2010-213701 |
| Mar. 31, 2011 | (JP) | 2011-077818 |
| Feb. 21, 2012 | (JP) | 2012-035472 |

(51) Int. Cl.
*G02B 6/42* (2006.01)
*G02B 6/38* (2006.01)

(52) U.S. Cl.
CPC ............ *G02B 6/4201* (2013.01); *G02B 6/4246* (2013.01); *G02B 6/3897* (2013.01); *G02B 6/3821* (2013.01); *G02B 6/4292* (2013.01); *G02B 6/421* (2013.01); *G02B 6/3878* (2013.01); *G02B 6/3825* (2013.01)
USPC .............................................. 385/92; 385/89

(58) Field of Classification Search
None
See application file for complete search history.

(56) References Cited

U.S. PATENT DOCUMENTS

| 4,798,440 A | 1/1989 | Hoffer et al. |
| 4,861,134 A | 8/1989 | Alameel et al. |

(Continued)

FOREIGN PATENT DOCUMENTS

| CN | 1335691 A | 2/2002 |
| CN | 1423143 A | 6/2003 |

(Continued)

OTHER PUBLICATIONS

Office Action issued in Japanese Patent Application No. 2010-083610 dated Sep. 10, 2013.

(Continued)

*Primary Examiner* — Mike Stahl
(74) *Attorney, Agent, or Firm* — Venable LLP; Michael A. Sartori; Tamatane J. Aga

(57) ABSTRACT

An optical transceiver capable of narrowing an extra space for an external optical fiber is disclosed. The optical transceiver of an embodiment provides an optical receptacle with a port, to which the external optical fiber is to be inserted, headed for a direction in diagonal to the longitudinal axis of the optical transceiver. In another embodiment, the optical transceiver provides an optical receptacle capable of turning the port thereof.

14 Claims, 25 Drawing Sheets

(56) References Cited

U.S. PATENT DOCUMENTS

| | | | |
|---|---|---|---|
| 5,037,175 | A | 8/1991 | Weber |
| 5,231,685 | A | 7/1993 | Hanzawa et al. |
| 5,337,396 | A | 8/1994 | Chen et al. |
| 5,347,605 | A * | 9/1994 | Isaksson ................. 385/92 |
| 5,757,998 | A | 5/1998 | Thatcher et al. |
| 5,956,449 | A * | 9/1999 | Otani et al. ............... 385/134 |
| 6,058,235 | A | 5/2000 | Hiramatsu et al. |
| 6,085,006 | A | 7/2000 | Gaio et al. |
| 6,164,838 | A | 12/2000 | Maehara et al. |
| 6,239,427 | B1 | 5/2001 | Mizue |
| 6,494,623 | B1 | 12/2002 | Ahrens et al. |
| 6,644,866 | B1 * | 11/2003 | Kusuda et al. ............. 385/88 |
| 6,804,431 | B2 | 10/2004 | Kowalkowski et al. |
| 6,811,326 | B2 | 11/2004 | Keeble et al. |
| 6,873,800 | B1 | 3/2005 | Wei et al. |
| 6,876,809 | B1 * | 4/2005 | Sonderegger et al. ........ 385/137 |
| 6,923,580 | B2 | 8/2005 | Ohno et al. |
| 7,094,091 | B2 * | 8/2006 | Grzegorzewska et al. .... 439/354 |
| 7,156,562 | B2 | 1/2007 | Mazotti et al. |
| 7,210,855 | B2 * | 5/2007 | Rossi et al. .............. 385/53 |
| 7,343,078 | B2 * | 3/2008 | Spisany et al. ............. 385/137 |
| 7,364,446 | B2 | 4/2008 | Kurashima |
| 8,104,977 | B2 | 1/2012 | Sone et al. |
| 2002/0031312 | A1 * | 3/2002 | Iwamoto ................. 385/88 |
| 2002/0131122 | A1 | 9/2002 | Anderl et al. |
| 2002/0181900 | A1 * | 12/2002 | Loch et al. ............... 385/92 |
| 2003/0044129 | A1 | 3/2003 | Ahrens et al. |
| 2003/0048999 | A1 * | 3/2003 | Imabayashi et al. .......... 385/88 |
| 2003/0095780 | A1 | 5/2003 | Chang |
| 2003/0171022 | A1 | 9/2003 | Distad et al. |
| 2003/0185525 | A1 | 10/2003 | Lacy et al. |
| 2003/0236019 | A1 | 12/2003 | Hanley et al. |
| 2004/0062493 | A1 | 4/2004 | Ishigami et al. |
| 2004/0081418 | A1 | 4/2004 | Kurashima et al. |
| 2004/0086240 | A1 | 5/2004 | Togami et al. |
| 2004/0184745 | A1 | 9/2004 | Mynatt et al. |
| 2004/0208459 | A1 | 10/2004 | Mizue et al. |
| 2005/0036746 | A1 | 2/2005 | Scheibenreif et al. |
| 2005/0168957 | A1 | 8/2005 | Kawauchi et al. |
| 2005/0213871 | A1 | 9/2005 | Schwiebert et al. |
| 2006/0093287 | A1 | 5/2006 | Yoshikawa et al. |
| 2006/0115219 | A1 | 6/2006 | Mudd et al. |
| 2006/0133744 | A1 | 6/2006 | Diaz |
| 2006/0215970 | A1 | 9/2006 | Mizue et al. |
| 2006/0245759 | A1 | 11/2006 | Kurashima |
| 2006/0257081 | A1 | 11/2006 | Ishigami et al. |
| 2007/0041687 | A1 | 2/2007 | Mizue et al. |
| 2007/0058911 | A1 | 3/2007 | Yu et al. |
| 2008/0062980 | A1 | 3/2008 | Sunaga et al. |
| 2008/0095541 | A1 | 4/2008 | Dallesasse |
| 2008/0205827 | A1 | 8/2008 | Moore et al. |
| 2009/0010600 | A1 | 1/2009 | Kim et al. |
| 2009/0016685 | A1 | 1/2009 | Hudgins et al. |
| 2009/0032291 | A1 | 2/2009 | Moore et al. |
| 2009/0052898 | A1 | 2/2009 | Oki et al. |
| 2010/0195961 | A1 | 8/2010 | Yoshikawa |
| 2010/0261378 | A1 * | 10/2010 | Davison et al. ............ 439/540.1 |
| 2012/0189254 | A1 | 7/2012 | Wang et al. |
| 2012/0269486 | A1 | 10/2012 | Ishii |
| 2013/0039660 | A1 | 2/2013 | Ho et al. |
| 2013/0336617 | A1 * | 12/2013 | Otte et al. ............... 385/77 |

FOREIGN PATENT DOCUMENTS

| | | | |
|---|---|---|---|
| CN | 1450729 | A | 10/2003 |
| CN | 1651953 | A | 8/2005 |
| CN | 101278220 | A | 10/2008 |
| CN | 101403812 | A | 4/2009 |
| CN | 101527377 | A | 9/2009 |
| JP | H-02-46410 | A | 2/1990 |
| JP | 6-337317 | A * | 12/1994 |
| JP | 2001-168573 | A | 6/2001 |
| JP | 2004-103743 | A | 4/2004 |
| JP | 2004-247700 | A | 9/2004 |
| JP | 2004-273924 | A | 9/2004 |
| JP | 2005-025093 | A | 1/2005 |
| JP | 2005-099769 | A | 4/2005 |
| JP | 2005-148629 | A | 6/2005 |
| JP | 3113384 | U | 9/2005 |
| JP | 2006-184708 | A | 7/2006 |
| JP | 2006-251833 | A | 9/2006 |
| JP | 2007-078975 | A | 3/2007 |
| JP | 2007-102112 | A * | 4/2007 |
| JP | 2007-166005 | A | 6/2007 |
| JP | 2007-310233 | A | 11/2007 |
| JP | 2007-316226 | A | 12/2007 |
| JP | 2009-302130 | A | 12/2009 |
| JP | 2010-072651 | A | 4/2010 |
| JP | 2010-072652 | A | 4/2010 |
| JP | 2010-133989 | A | 6/2010 |
| JP | 2011-033644 | A | 2/2011 |
| JP | 2011-118337 | A | 6/2011 |

OTHER PUBLICATIONS

Office Action in U.S. Appl. No. 13/118,101 dated Apr. 11, 2013.
Office Action in U.S. Appl. No. 13/118,096 dated Apr. 25, 2013.
Office Action in U.S. Appl. No. 13/118,078 dated May 9, 2013.
CFP Multi-Source Agreement (MSA) Hardware Specification Revision 1.4, pp. 1-53, Jun. 7, 2010.
Notice of Allowance in Japanese Patent Application No. 2010-105557, dated Jan. 7, 2014.
Notice of Allowance in Japanese Patent Application No. 2010-105560, dated Jan. 7, 2014.
Notice of Allowance in Japanese Patent Application No. 2010-114311, dated Jan. 7, 2014.
Office Action in Chinese Patent Application No. 201210313554.8, dated Dec. 23, 2013.
Office Action in Chinese Patent Application No. 201210313557.1, dated Jan. 21, 2014.
Office Action in Chinese Patent Application No. 201210313877.7, dated Jan. 20, 2014.
Office Action in U.S. Appl. No. 13/118,053, dated Jan. 8, 2014.
Office Action in U.S. Appl. No. 13/118,068, dated Feb. 10, 2014.
CFP Multi-Source Agreement (MSA) Draft 1.0, pp. 1-52, Mar. 23, 2009.
Office Action in Chinese Patent Application No. 201210313886.6, dated Feb. 26, 2014.

* cited by examiner

OPTICAL TRANSCEIVER HAVING OPTICAL RECEPTACLE ARRANGED DIAGONALLY TO LONGITUDINAL AXIS

CROSS-REFERENCE TO RELATED APPLICATIONS

This application is a continuation-in-part of U.S. patent application Ser. No. 12/916,080, filed on Oct. 29, 2010, which claims priority to Provisional Application Ser. No. 61/261, 105 filed on Nov. 13, 2009 and Provisional Application Ser. No. 61/314,801 filed on Mar. 17, 2010, and claims the benefit of Japanese Patent Application No. 2009-248592, filed Oct. 29, 2009, Japanese Patent Application No. 2010-083610, filed Mar. 31, 2010, Japanese Patent Application No. 2010-105557, filed Apr. 30, 2010, Japanese Patent Application No. 2010-105560, filed Apr. 30, 2010, Japanese Patent Application No. 2010-114311, filed May 18, 2010, and Japanese Patent Application No. 2010-213701, filed Sep. 24, 2010. This application claims the benefit of Japanese Patent Application No. 2011-077818, filed Mar. 31, 2011 and Japanese Patent Application No. 2012-035472, filed Feb. 21, 2012. All of the above-identified applications are incorporated herein by reference in their entirety.

BACKGROUND

1. Field

One embodiment of the present invention relates to a housing of an optical transceiver, in particular, one embodiment of the invention relates to a housing implemented with an optical receptacle arranged diagonally to the longitudinal axis of the optical transceiver.

2. Description of the Related Art

One type of optical transceivers exposes an optical cavity of the optical receptacle from a face plate of the host system on which the optical transceiver is to be installed. The cavity extends along the longitudinal axis of the optical transceiver and receives an external optical connector securing an optical fiber. When the external optical connector is inserted into the cavity and engaged with the optical receptacle, the external optical fiber is secured, and thereby extends along the longitudinal axis of the optical transceiver, which is perpendicular or normal to the face plate. This arrangement requires an enough space just in front of the face plate to receive the external optical fiber.

SUMMARY

One aspect of the present invention is for an optical transceiver; in particular, one embodiment of the invention is for a housing of the optical transceiver. The optical transceiver of an embodiment of the invention includes, an optical receptacle, an optical subassembly, an electronic circuit, and a housing. The optical receptacle may receive an external optical connector therein. The optical subassembly may perform conversion between an electrical signal and an optical signal, and may be coupled with the optical receptacle by an inner fiber. The electronic circuit may be electrically coupled with the optical subassembly. The housing may install the optical receptacle, the optical subassembly, the inner fiber, and the electronic circuit therein. In one embodiment of the present invention, the housing may provide a longitudinal axis. A feature of the embodiment of the invention is that the optical receptacle has a cavity, into which the external connector is to be inserted, extending in diagonal to the longitudinal axis of the optical transceiver.

Because the cavity of the optical receptacle extends in diagonal to the longitudinal axis, the external connector may be inserted into the cavity also in diagonal to the longitudinal axis, which may make a substantial angle less than a right angle for the external fiber pulled out from the external connector, and may narrow a wiring space for the external fiber in front of the optical transceiver.

The housing may provide first to third areas, where they may mount the optical receptacle, the optical subassembly, and the electronic circuit, respectively. The first area of the embodiment may be surrounded by a rear wall and a pair of side walls. The side wall may have a groove for setting the inner fiber drawn out from the optical receptacle therein. Another feature of the embodiment is that the groove in the wall may extend in diagonal to the longitudinal axis of the optical transceiver; favorably, the groove may correspond to an extended line of the inner fiber drawn out from the optical receptacle, which may suppress stresses to be applied to the inner fiber.

The inner fiber may be wired in the housing to be drawn out from the optical receptacle, set in the groove, drawn along a side of the housing in the second area to the third area, rounded in the third area, inversely drawn to the second area along another side in the second area, and rounded in the second area to reach the optical subassembly in the second area. The inner fiber may be thus wired within a whole of the housing, and accordingly, the stress to be applied to the inner fiber may be reduced.

The optical transceiver may include a plurality of transmitter optical subassemblies (TOSA), a plurality of receiver optical subassemblies (ROSA), an optical multiplexer, an optical de-multiplexer, a plurality of transmitter fibers, and a plurality of receiver fibers. Each of the TOSAs may process a specific optical signal whose wavelength is different from others, and each of the ROSAs may also process a specific optical signal whose wavelength is different from others. The optical multiplexer may multiplex optical signals transmitted by the TOSAs, while, the optical de-multiplexer may de-multiplex an optical signal externally provided into optical signals provided to the ROSAs. The transmitter fibers may optically couple the TOSAs with the optical multiplexer; while, the receiver fibers may optically couple the optical de-multiplexer with the ROSAs. In an embodiment, each of the transmitter fibers and each of the receiver fibers have an inner connector to be engaged with the corresponding TOSA and ROSA, respectively. This arrangement of the inner connector may make it possible to replace only one of TOSAs and/or ROSAs.

In an embodiment, the inner fiber may include a sleeve in a tip thereof and the optical receptacle may assemble with an attachment. This sleeve may be inserted into the cavity. The attachment may fasten the sleeve against the optical receptacle.

Another aspect of the invention relates to an optical transceiver modified from the former embodiment. The modified embodiment may include, instead of the aforementioned optical receptacle, a modified optical receptacle that may turn the cavity thereof around an axis perpendicular to the longitudinal and lateral directions of the optical transceiver, namely, around the vertical axis of the transceiver.

The first area of the housing, where the optical receptacle of the modified embodiment is installed thereon, may provide a metal box having a rear wall with an aperture and side walls. The inner fiber, drawn out from the modified optical receptacle, passes through the aperture to couple optically with the optical subassembly. The optical transceiver of the modified embodiment may further include a gasket which is fit with the aperture. The inner fiber passing the aperture may be set in the gasket. The housing may provide a groove in the second area thereof. The inner fiber passing through the aperture of the metal box may be set in the groove. The groove may be flared toward the first area. This arrangement of the groove may reduce a stress to be applied to the inner fiber.

BRIEF DESCRIPTION OF THE DRAWINGS

The foregoing and other purposes, aspects and advantages will be better understood from the following detailed description of a preferred embodiment of the invention with reference to the drawings, in which:

FIG. 7A shows the optical receptacle viewed from the front; while, FIG. 7B shows the optical receptacle view from the rear;

DETAILED DESCRIPTION

Next, some embodiments will be described as referring to drawings. In the explanation of the drawings, numerals or symbols same to each other will refer to the elements same to each other without overlapping explanations.

(First Embodiment)

Figure 1:
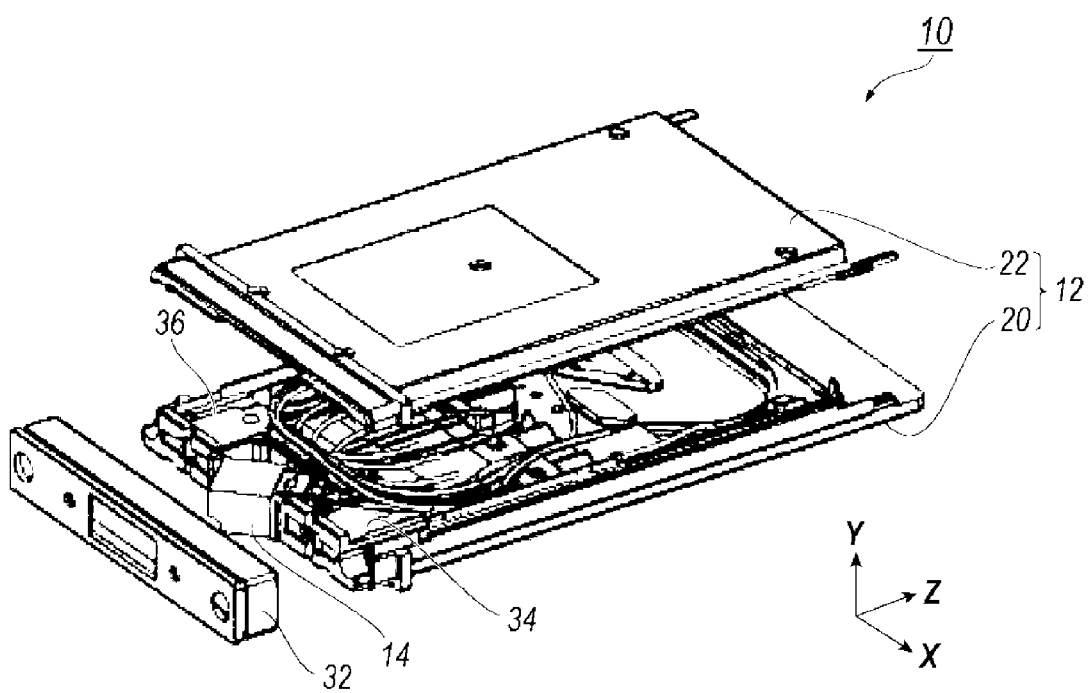
FIG. 1 is an exploded view of an optical transceiver according to an embodiment of the invention.
Figure 2:
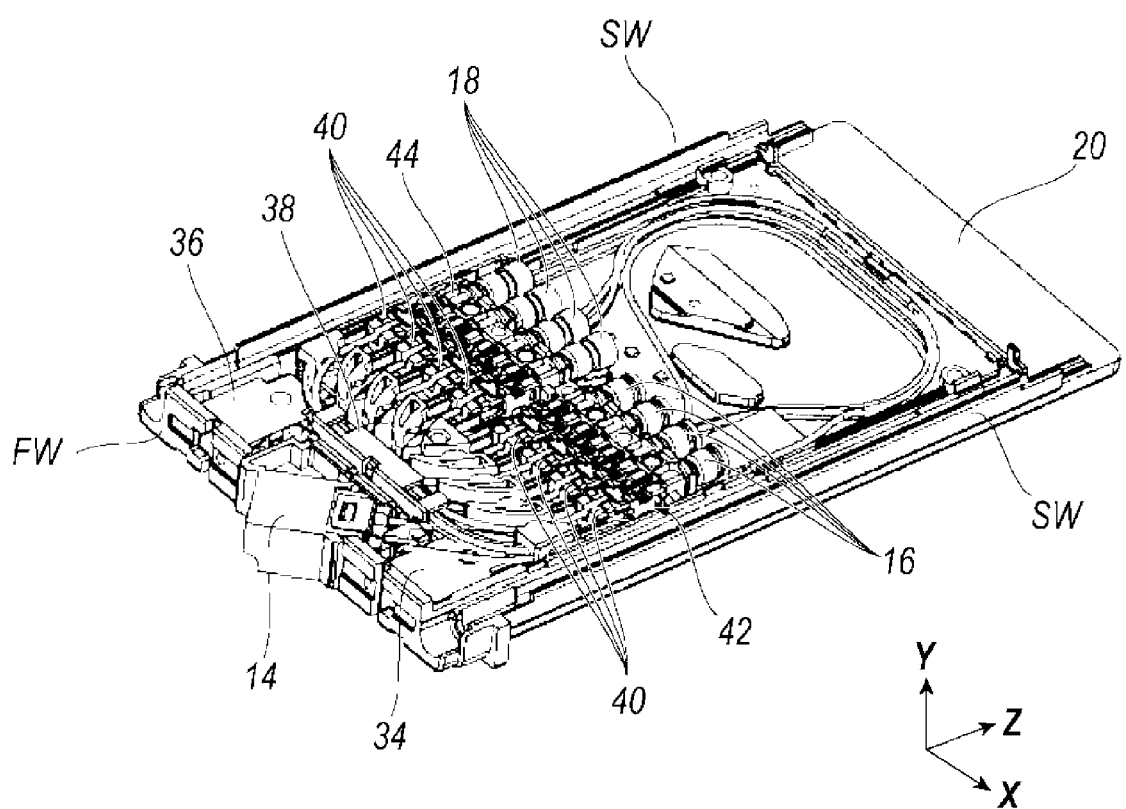
FIG. 2 is a perspective view showing an inside of the optical transceiver by removing a front cover and the top housing.

FIG. 1 is an exploded view of an optical transceiver according to an embodiment of the invention; FIG. 2 is a perspective view removing a front cover and the top housing to show an inside of the optical transceiver; and FIG. 3 is a plan view showing the bottom housing and inner fibers.

Figure 3:
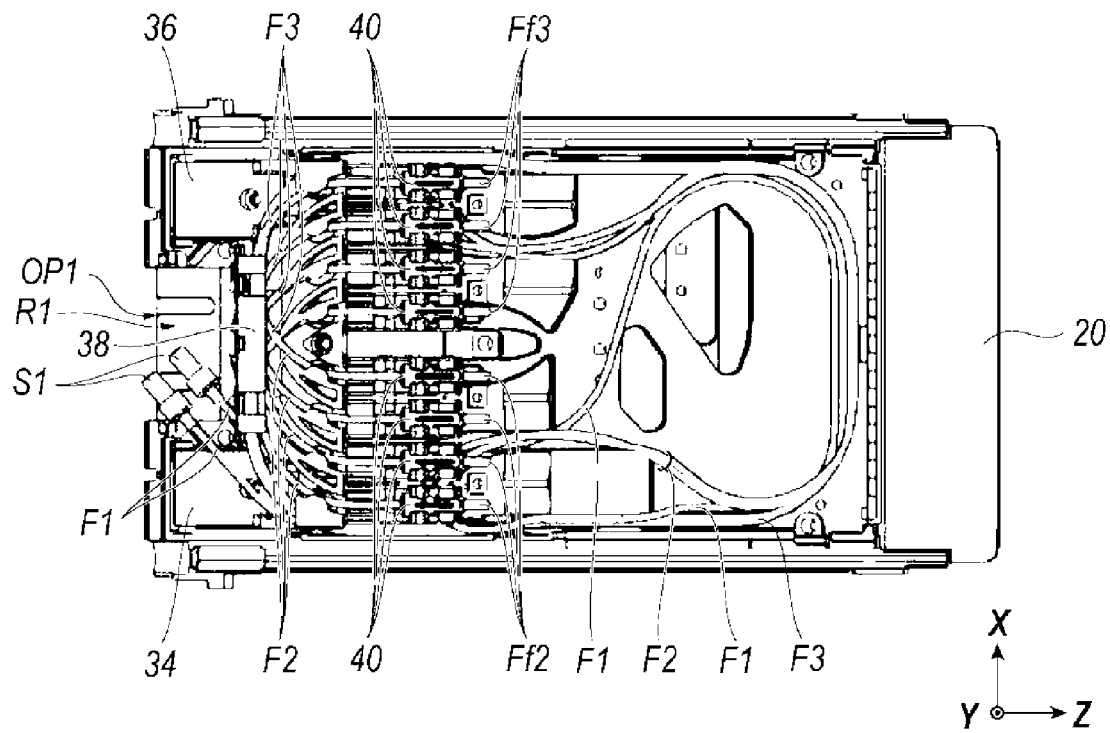
FIG. 3 is a plan view of the bottom housing of the optical transceiver and inner fibers.

The optical transceiver 10 shown in FIGS. 1 to 3 is to be inserted in a cage provided in the host system along the Z-axis, which is the longitudinal direction of the optical transceiver 10; and includes the housing 12, a plurality of transmitter optical subassemblies (TOSA) 16, a plurality of receiver optical subassemblies (ROSA) 18, and a pair of inner fibers F1. The housing 12, which is made of, for instance, stainless steel or aluminum, may include the bottom housing 20 and the top housing 22. In the specification below, contexts "top", "bottom, "front", "rear" and so on are used for explanations sake and do not restrict the embodiment.

Figure 4:
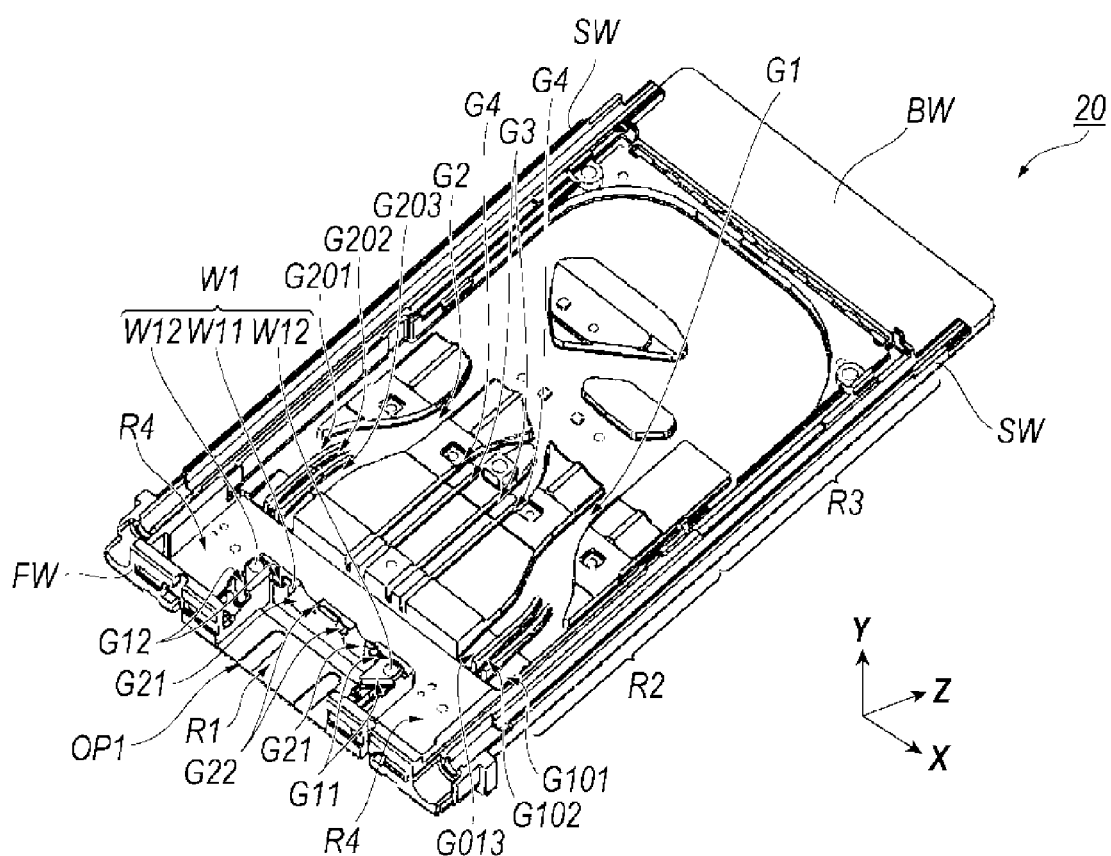
FIG. 4 is a perspective view showing an inside of the bottom housing.

FIG. 4 shows an inside of the bottom housing. The bottom housing 20 includes a bottom BW, a pair of sides SW, and a front FW. The sides SW rise in substantially a right angle at respective ends of the bottom BW. The front FW also rises in a right angle at the front end of the bottom BW. The front FW extends in parallel to the face plate of the host system. The front FW forms in a center portion thereof an opening OP1 from which a first area R1 exposes. The bottom housing 20 also includes, in addition to the first area R1 above described, second and third areas, R2 and R3, respectively, in this order along the longitudinal direction of the optical transceiver 20.

The first area R1 is partitioned by a wall W1 that includes first and second walls, W11 and W12, extending in perpendicular to each other to form a box. The rear wall W11 is in a rear end of the first area R1, while, the second walls W12 play a role of the side wall for the first area R1.

The wall W1 provides a pair of first grooves G11 extending in a direction diagonal to both the longitudinal and lateral direction (X-Direction in the present embodiment) of the optical transceiver 20. The first grooves G11 receive the inner fibers F1. The wall W1 also provides another pair of grooves G12 also extending diagonal to the longitudinal and lateral directions but crossing the direction of the first groove. That is, the direction in which the former grooves G11 extend and the direction in which the latter grooves G12 extend are axially symmetric with respect to the longitudinal direction of the optical transceiver.

The rear wall W11 further provides a pair of concavities G21 extending longitudinally, where each of the concavities G21 may set a sleeve extending from the optical receptacle to be mated with an optical connector of the SC type. Accordingly, the paired concavities G21 have the pitch, or distance therebetween, satisfying the standard of the SC optical connector.

The rear wall W11 still further provides another pair of concavities G22 between two concavities G21 and extending longitudinally. The second concavities G22 may set therein a sleeve of another optical receptacle to be mated with the optical connector of, what is called, the LC-type. The pitch or distance of the second concavities G22 follows the standard of the LC optical connector.

In the present embodiment, the concavities, G21 and G22, are formed between grooves, G11 and 12. As shown in FIG. 4, the first grooves G11 may be formed on one of the side walls W12, or one of which is formed on the side wall W12, while, the other is formed on a top of the rear wall W11 close to the side wall W12. The arrangement of the grooves G12 may be same with those of the first grooves G11.

Figure 5:
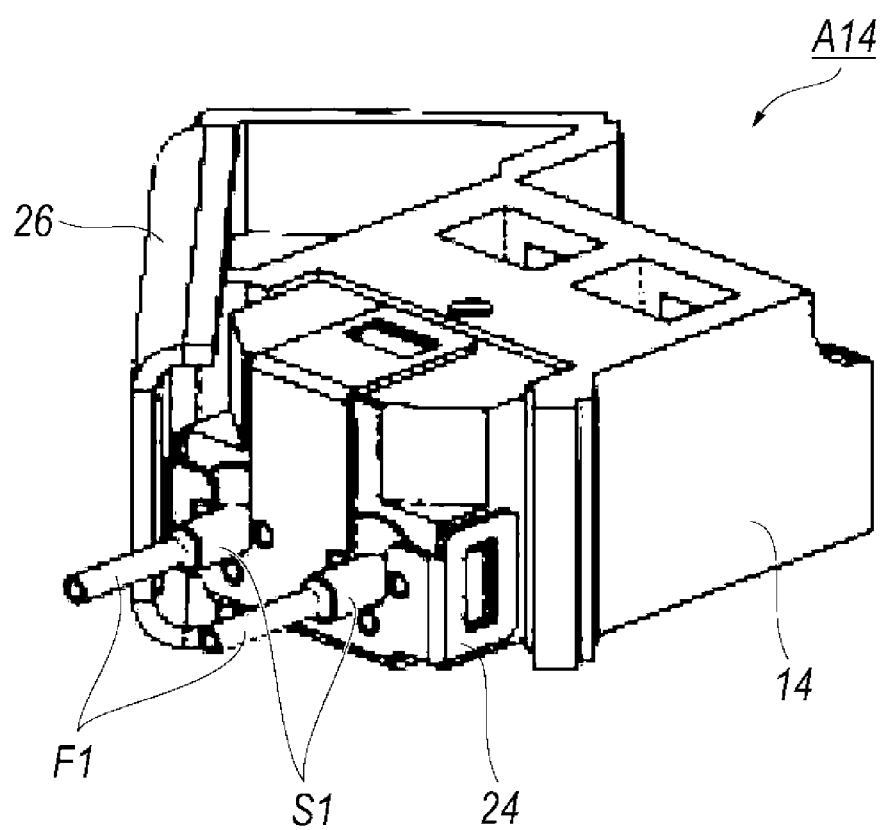
FIG. 5 is a perspective view of an optical receptacle assembly installed in the housing.
Figure 6:
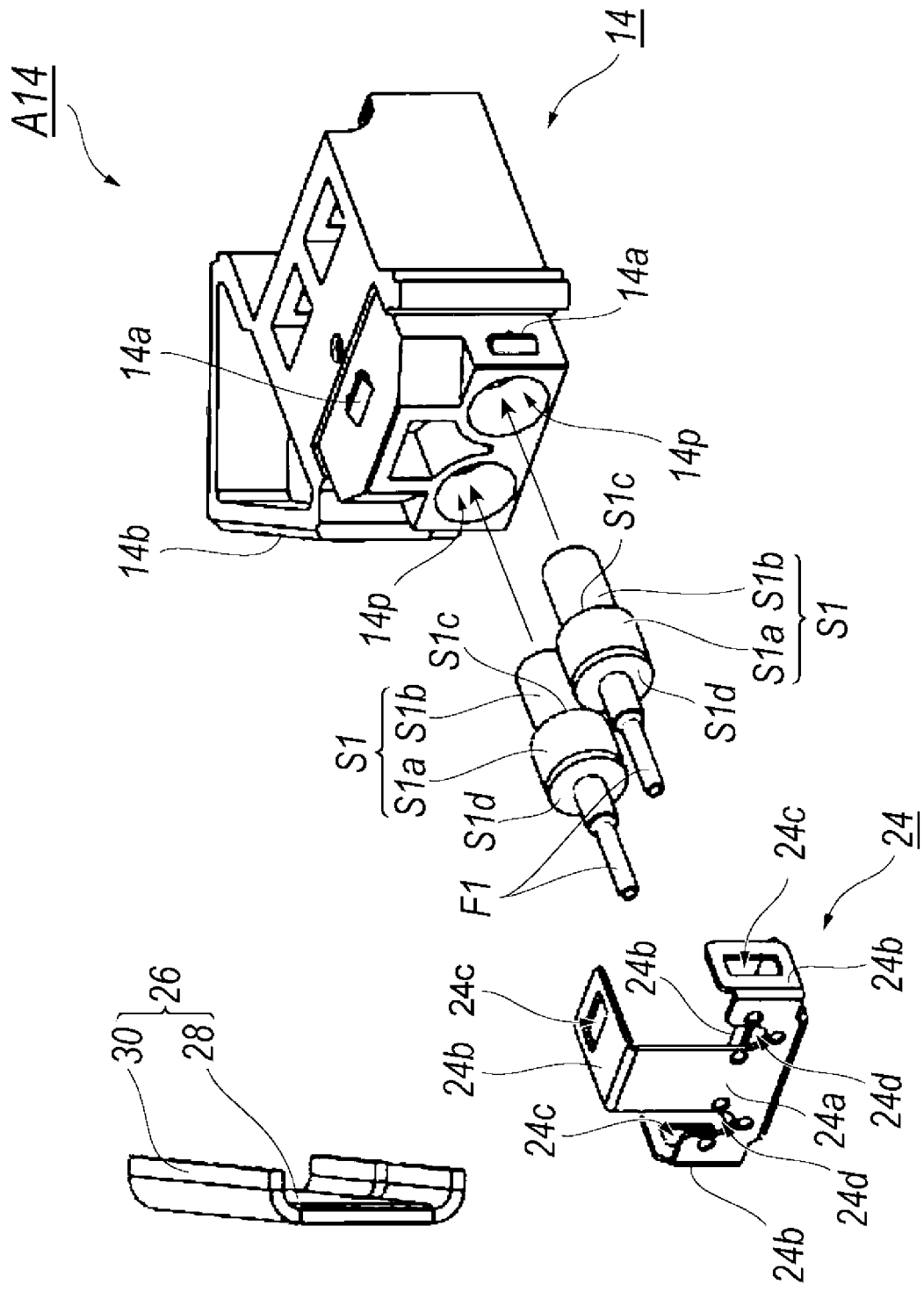
FIG. 6 is an exploded view of the receptacle assembly shown in FIG. 5.
Figures 7A, 7B:
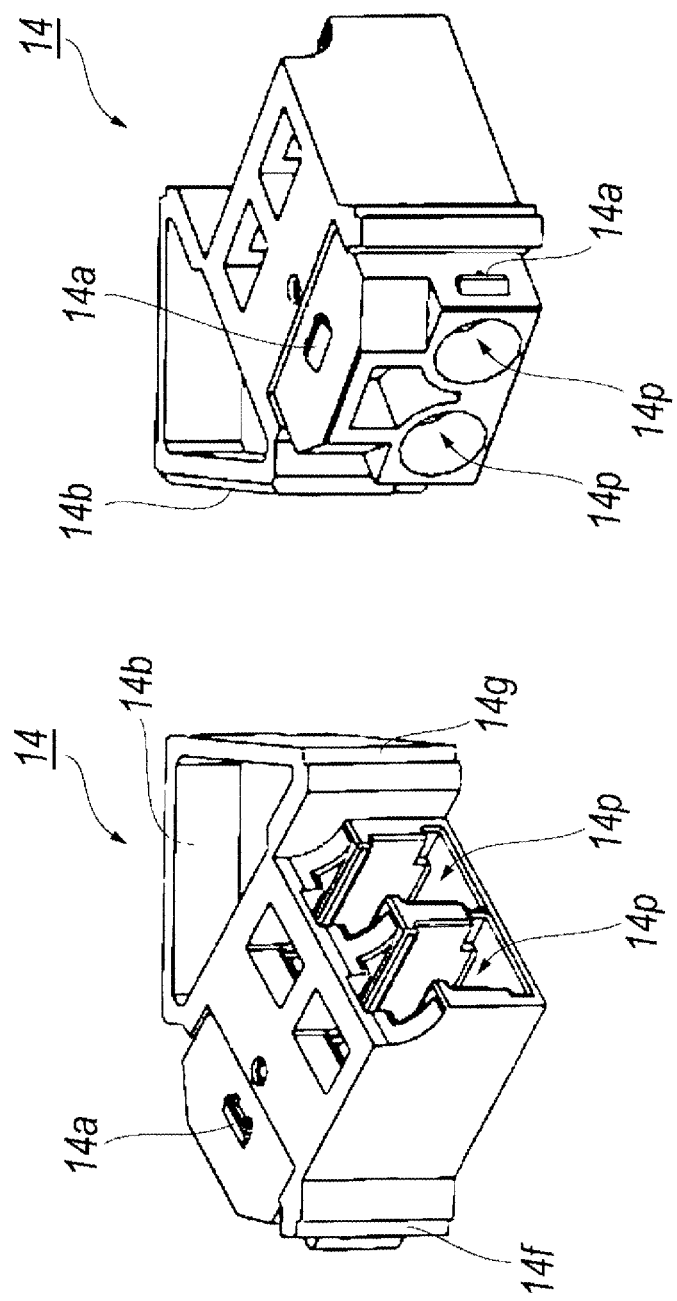
Figure 8:
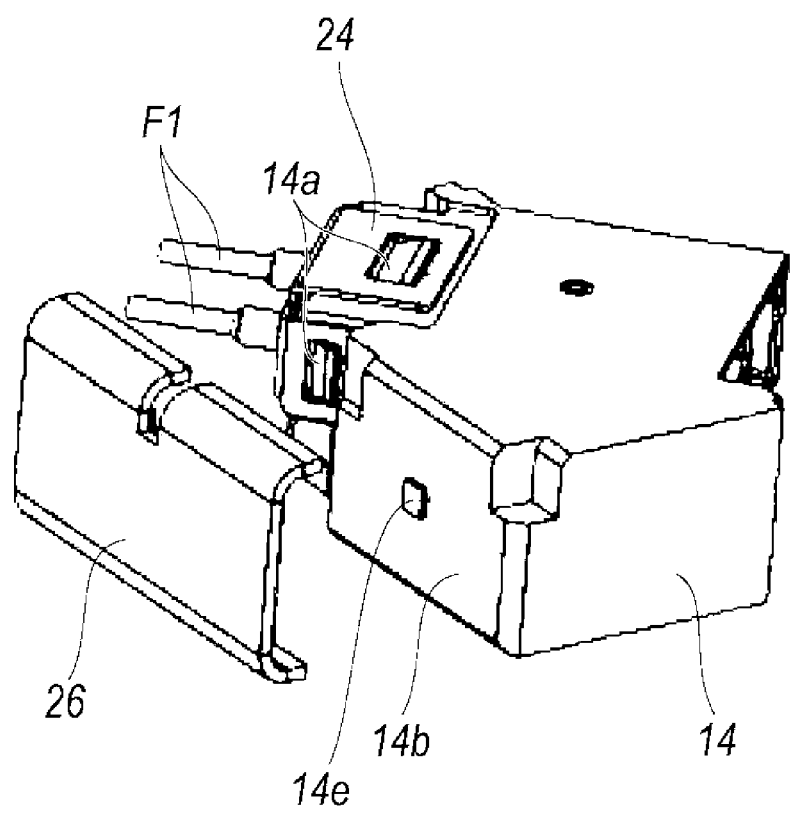
FIG. 8 shows the receptacle assembly shown in FIG. 6 but disassembling the shield from the optical receptacle.
Figure 9:
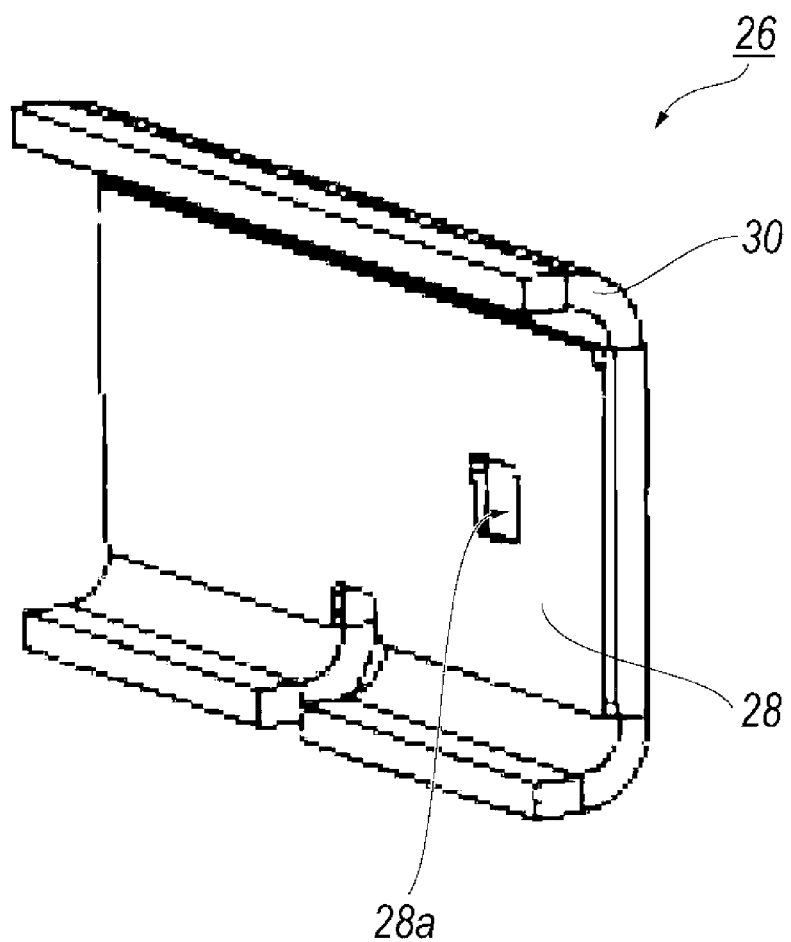
FIG. 9 is a perspective view of the shield to be attached to the optical receptacle.

The first area R1 partitioned by the walls, W11 and W12, may mount the receptacle body 14 thereon. Referring to FIGS. 5 to 9, details of the receptacle body 14 according to an embodiment of the invention will be described. FIG. 5 shows a receptacle assembly A14 including the optical receptacle of the embodiment; FIG. 6 is an exploded view of the receptacle assembly; FIGS. 7A and 7B are perspective views of the optical receptacle A14, where the receptacle body 14 is viewed from the front in FIG. 7A to show the cavities 14p of the receptacle body 14, while, it is viewed from the rear in FIG. 7B to show the other end of the cavity 14p; FIG. 8 is a perspective view of the receptacle assembly A14 without any shield 26; and FIG. 9 is a perspective view of the shield 26.

The optical transceiver 10 according to the present embodiment may provide the receptacle assembly A14 shown in FIGS. 5 and 6. The receptacle assembly A14 includes an receptacle body 14, a pair of sleeves S1, an attachment 24, and a shield 26.

The receptacle body 14, which may be made of resin, includes a pair of cavities 14p. The cavities 14p, when the receptacle body 14 is set in the first area R1, extend along substantially in parallel to the first groove G11. As shown in FIGS. 5 and 6, the receptacle assembly A14 receives the external connector in the cavities 14p thereof from the front; while, it receives sleeves S1 in the other end thereof from the rear. The external optical connector may optically couple with the sleeve S1 in the cavities 14p.

The sleeve S1 has a cylindrical shape as shown in FIG. 6, includes a flange S1a and a tip S1b. The flange S1a has a diameter greater than a diameter of the tip S1b, that is, the flange forms a step S1c with respect to the tip S1b. The tip S1b is inserted into the cavity 14p of the receptacle body 14 such that the step S1c abuts against a wall formed within the cavity 14p; that is, the wall formed inside of the cavity 14p shows a function of the stopper.

The attachment 24, when it is assembled with the receptacle body 14, pushes the surface S1d of the sleeve S1 to press the step S1c against the inner surface of the cavity 14p above described. The attachment 24, which may be made of metal plate, includes a rear plate 24a and four hooking portions 24b extending forward from the rear plate 24a. The rear plate 24a provides a pair of cuts 24d thorough which the inner fiber F1 passes.

The receptacle body 14 has a plurality of hooks 14a; while, the hooking portions 24b are bent forward from respective ends of the rear plate 24a and have respective openings 24c to be hooked with the hooks 14a in the receptacle body 14. Engaging the hooks 14a of the receptacle body 14 with the openings 14c to assemble the attachment 24 with the receptacle body 14, the attachment 24 pushes the sleeve S1 forwardly to cause the step S1c to abut against the inner step of the cavity 14p; thus, the sleeve S1 may be securely held between the receptacle body 14 and the attachment 24.

The receptacle body 14 may have a polygonal plane shape, roughly a pentagon, as shown in FIG. 8. Two sides of the pentagon opposite to each other each provides the pair of cavities 14p, while another side 14b of the pentagon may show a function of the rear wall that faces the rear wall W11 of the bottom housing 20. The size of the rear wall 14b is about half of the rear wall W11. Specifically, the rear wall 14b only covers a portion of the rear wall W11 where one of the concavities G21 and one of the other concavities G22 are formed. The rear wall 14b attaches the shield 26 thereto.

Specifically, the shield 26 comprises a support 28 and a sheet 30. The support 28 may be made of metal plate, while, the sheet 30 is an elastic or bendable member made of, for instance, electrically conductive felt, and stuck on the metal support 28 so that the surface of the metal support 28, on which the sheet 30 is not stuck, faces the rear wall 14b of the receptacle body 14.

The metal support 28 provides a hole 28a, while, the rear wall 14b of the receptacle body 14 has a projection 14e as shown in FIG. 8. Mating the projection 14e with the hole 28a, the shield 26 may be assembled with the receptacle body 14.

Figure 10:
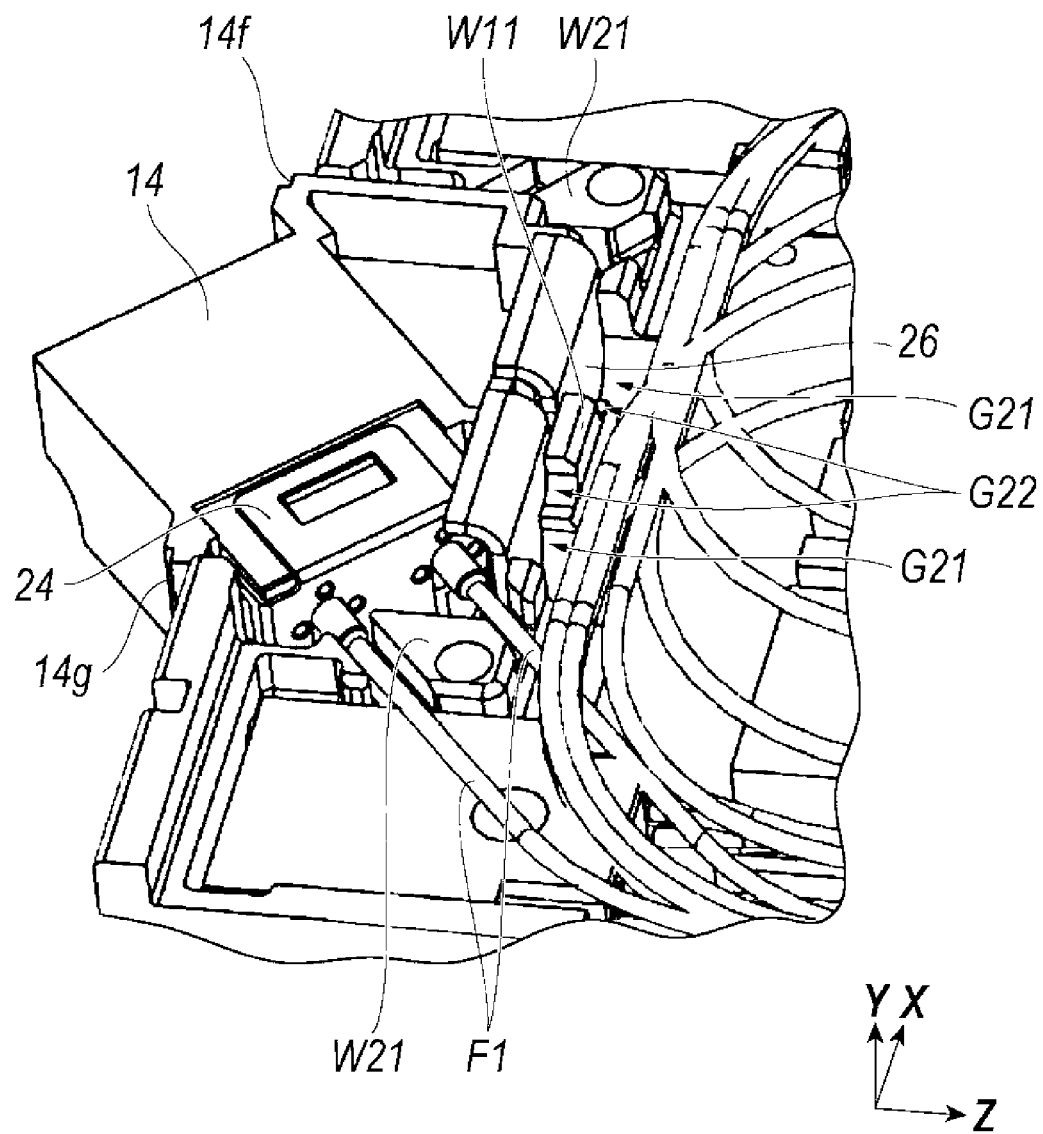
FIG. 10 magnifies a front portion of the optical transceiver shown in FIGS. 1 to 4.
Figure 11:
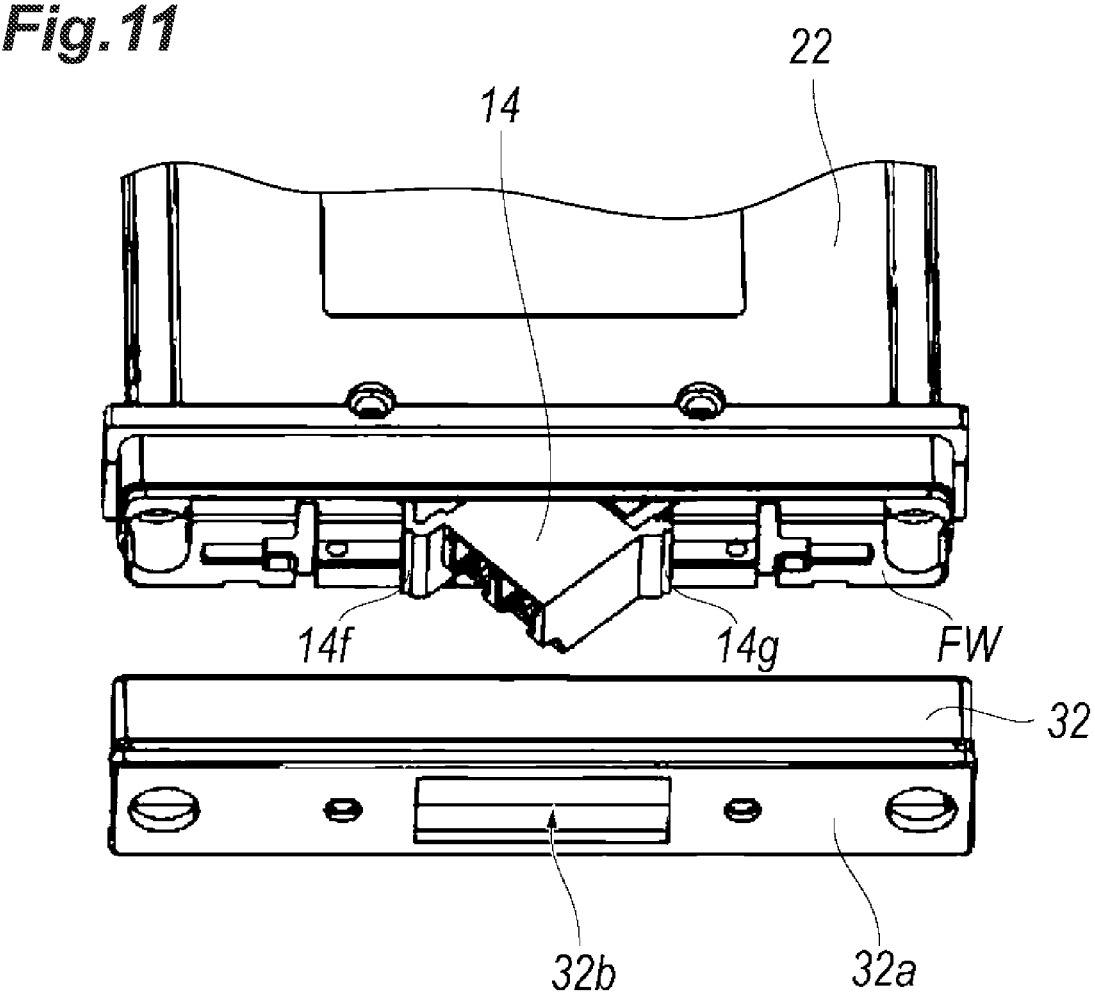
FIG. 11 shows the front of the housing and a front cover when it is detached from the housing.
Figure 12:
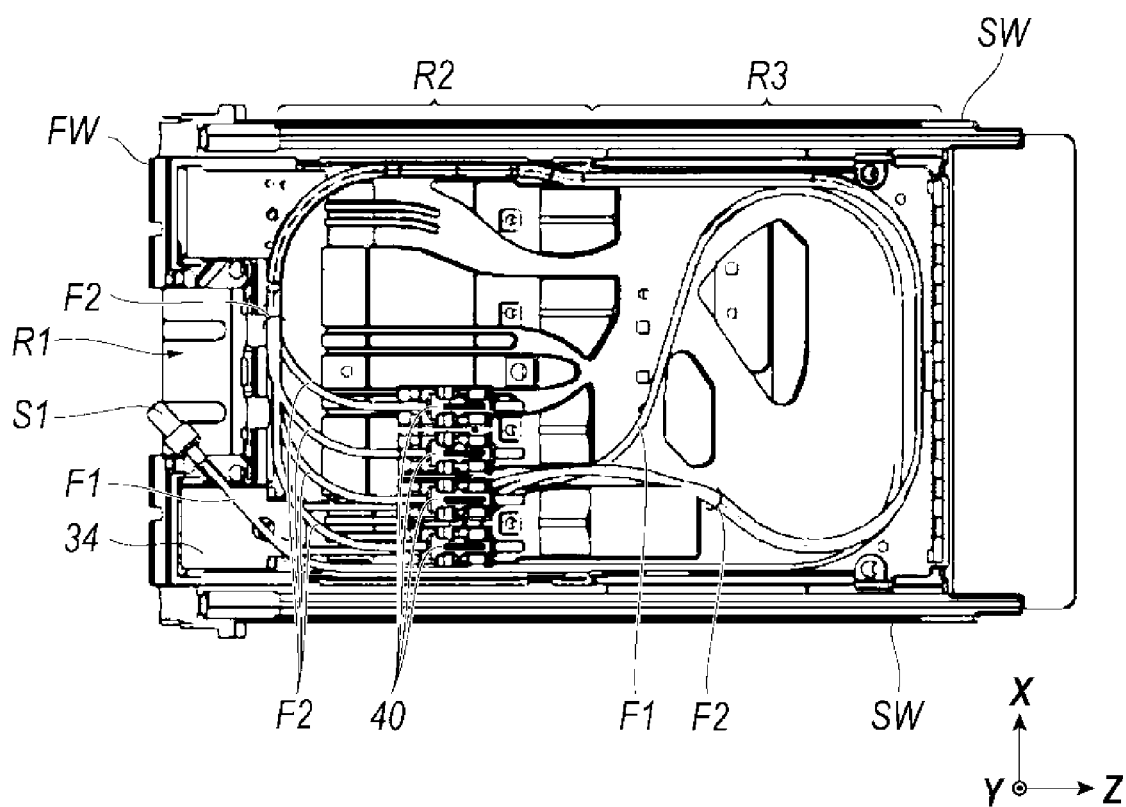
FIG. 12 shows wirings of one of inner fibers for the transmitter and a plurality of transmitter fibers.

Referring further to FIGS. 10 and 11 in additions to FIGS. 5 to 9, FIG. 10 magnifies a front portion of the optical transceiver 10, while, FIG. 11 shows the front portion and the front cover 32. As shown in FIGS. 5, 8 and 10, the shield 26 has a lateral width greater than a width of the rear wall 14b of the receptacle body 14. That is, the shield 26, which is put between the rear wall 14b of the receptacle body 14 and the rear wall W11 in the first area R1, covers the whole rear wall W11 to close the first concavities G21 and the second concavities G22. The shield 26 is pushed rearward by the front cover 32 through the receptacle body 14 as shown in FIG. 11.

The front cover 32, when it is assembled with the housing 12 in the front FW thereof by screws, pushes the receptacle body 14 against the rear wall W11 as putting the shield 26 therebetween. The front cover 32 provides an opening 32b in a center of the front surface 32a thereof to expose the cavities 14p of the receptacle. The front cover 32 also provides a pair of projections in respective sides of the opening 32b in a rear surface opposite to the front surface 32a, which is hidden in FIG. 11; while, the receptacle body 14 has surfaces, 14f and 14g, in respective sides of the cavities 14p. The projections in the rear surface push the surfaces, 14f and 14g, corresponding thereto to press the receptacle body 14 against the rear wall W11; and then, the sheet 30 of the shield 26 tightly abuts against the wall W11.

Although the rear wall 14b has an area narrower than that of the rear wall W11, namely, the shield 26 sticks out from the rear wall 14b, the sheet 30 may be tightly attached against the rear wall W11 because of the stiffness of the support 30. Thus, the first area R1 may be electrically shielded from the second area R2 by the arrangement of the shield 26 tightly attached to the rear wall W11 to cover two cavities, G21 and G22.

Referring to FIGS. 1 to 4 again, the bottom housing of the present embodiment further provides fourth areas R4 in respective sides of the first area R1. One of fourth areas R4 may mount the optical multiplexer 34, while, the other of fourth areas mounts the optical de-multiplexer 36. One of inner fibers F1 may optically couple with the optical multiplexer 34 and the other of the inner fiber F1 may couple with the optical de-multiplexer 36.

The optical transceiver 10 may install four TOSAs 16 each generating an optical signal whose wavelength is different from others. The optical transceiver 10 of the embodiment may provide four transmitter fibers F2 each optically coupled with the corresponding TOSA 16 and the optical multiplexer 34 to multiplex four optical signals. An optical signal multiplexed by the optical multiplexer 34 may be carried on one of the inner fibers F1 to transmit to the external fiber through the cavity 14p of the receptacle body 14. Each of the TOSAs 16 may receive an electrical signal from an electronic circuit mounted in the third area R3.

The optical transceiver 10 of the embodiment may receive by the optical de-multiplexer 36 another optical signal provided from another external fiber set in the cavity 14p of the receptacle body 14 and through the other inner fiber F1. The optical de-multiplexer 36 may de-multiplex this multiplexed optical signal into four optical signals each provided to the corresponding ROSA 18. The optical de-multiplexer 36 has four receiver fibers F3 to carry the received optical signals thereon. The ROSAs 18 each converts the optical signal into an electrical signal to output this electrical signal to an electronic circuit mounted in the third area R3.

Thus, the optical transceiver 10 may transmit/receive the multiplexed optical signal whose equivalent speed is 40 GHz or 100 GHz, that is, four TOSAs and four ROSAs may process an electrical signal and an optical signal with the speed of 10 GHz or 25 GHz.

The TOSAs 16 and the ROSAs 18 are mounted on the second area R2 of the bottom housing 20. This second area R2 also mounts a tray 38, eight (8) inner connectors 40 and two (2) integral holders, 42 and 44, where they are arranged in this order from the front toward the rear.

The one of the holders 42, which may support the TOSA 16 and fixed to the bottom housing 20, provides four slots arranged in lateral to support the TOSAs 16. The other holders 44, which may support the ROSA 18 and also fixed to the bottom housing 20, provides four slots also arranged in lateral to support the ROSAs 18. Each of eight inner connectors 40 is aligned with respective slots extending along the longitudinal direction. Four of inner connectors having ferrules Ff2 in respective tips thereof are provided for the transmitter fibers F2, while, rest four connectors having ferrules Ff3 in the tips thereof are prepared for the receiver fibers F3.

Eight inner connectors 40 are assembled with the tray 38 to be longitudinally movable against the tray 38 mounted on the bottom housing 20. Bringing the inner connectors 40 toward the holders, 42 and 44, the inner connectors 40 may be engaged with the holder, 42 or 44, to set the ferrules, Ff2 and Ff3, into respective sleeves of the TOSAs 16 and the ROSAs 18 to couple the ferrules with the TOSA 16 and the ROSA 18. While, pushing the inner connectors 40 toward the tray 38, the ferrule, Ff2 or Ff3, may release the engagement with the TOSA 16 or the ROSA 18, and be set in a position not interfering the replacement of the TOSA 16 or the ROSA 18. That is, the inner connectors 40 may be not only fully disengaged with the sleeve of the TOSA 16 and that of the ROSA 18 but show no overlap between the connector 40 and the sleeve.

Next, the wiring of inner fibers F1, transmission fibers F2 and receiver fibers F3 in the housing 20 will be described as referring to FIGS. 2 to 4, 12 and 13. One of the inner fibers F1 passes through one of the grooves G11 from the first area R1 to the second area R2; runs along the side SW in the transmitter side (TX side) to the third area R3; widely rounded in the third area R3; and then heads for the optical multiplexer 34.

The bottom BW of the second area R2 provides grooves or slots, G1, G101, G102, and G103, extending along the longitudinal direction of the transceiver 10. The groove G1 is formed in a rear with respect to the other grooves, G101 to G103. The latter grooves, G101 to G103, are laterally arranged, divided from the former groove G1 and head for the side of the fourth area R4 where the optical multiplexer 34 is mounted. The inner fiber F1, which is rounded in the third area R3 as described above, passes through the grooves G1 and G102, and runs under the tray 38 to reach the optical multiplexer 34.

The transmitter fibers F2, which are drawn out from the optical multiplexer 34, are set within the groove G1, rounded in the third area R3, runs along the other side SW (Rx side) in the areas, R3 and R2, and guided in the tray 38 to reach the inner connectors 40 for the TOSAs 16. The tray 38 provides slots to guide the transmitter fibers F2 and the receiver fibers F3 to the inner connectors 40. These slots may have eaves to prevent the fiber set therein from spilling out therefrom.

Figure 13:
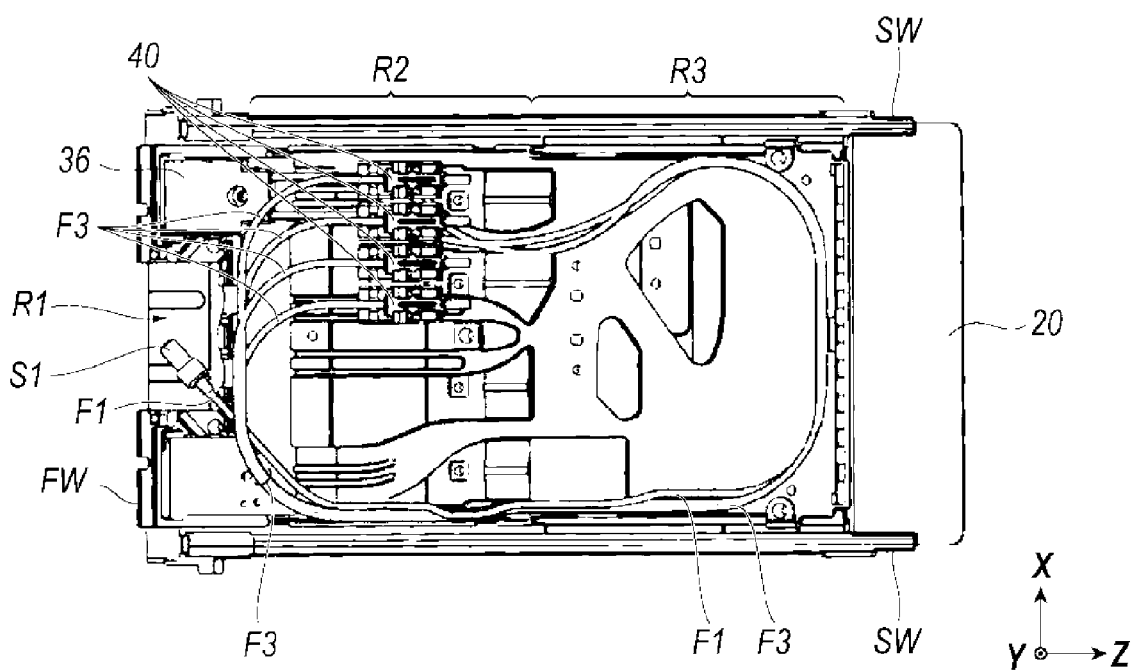
FIG. 13 shows wirings of the other of inner fibers for the receiver and a plurality of receiver fibers.

Referring to FIG. 13, the other inner fiber F1 for the receiver is wired along the side SW by passing through the other groove G11 in the first area R1; then, widely rounded in the third area R3 to head for the receiver side, and wired along the other side SW in the third and second areas, R3 and R2, to reach the optical de-multiplexer 36. The bottom BW of the second area R2 also provides grooves (or slots), G2 and G201 to G203, as shown in FIG. 4, each extending along the longitudinal direction of the transceiver 10. Moreover, the groove G2 is formed in a rear of the other grooves, G201 to G203. The inner fiber F1, which is rounded in the third area R3 and heads to the second area R2, is first set in the former groove G2, and then set in the groove G202 to reach the optical de-multiplexer 36 in the other fourth area R4. The receiver fibers F3, which are drawn out from the optical de-multiplexer 36, pass in the grooves, G201 and G203, and the other groove G2 to reach the third area R3. Then, the receiver fibers F3 are rounded in the third area R3; wired along the side SW in the transmitter side; rounded toward the receiver side in the front of the second area R2; and finally guided by the tray 38 to reach the inner connectors 40.

The optical transceiver 10 of the embodiment, as shown in FIG. 2, mounts the inner connectors 40, holders, 42 and 44, above the transmitter fibers F2 and the receiver fibers F3 in the second area R2; while, the optical transceiver 10 mounts the circuit board above the inner fiber F1, the transmitter fibers F2 and the receiver fibers F3. This arrangement of the inner connectors 40, the holders, 42 and 44, and the circuit board may effectively prevent the fibers, F1 to F3, from sticking out from disordering.

Moreover, the optical transceiver 10 of the embodiment provides the third area R3 to wire the inner fibers, F1 to F3, where the inner fibers, F1 to F3, in excess lengths thereof may be adequately treated. The third area R3 may install another tray to guide the inner fibers, F1 to F3. The other tray to be installed in the third area R3 may provide a function or means to prevent the fibers from sticking out.

Thus, the optical transceiver 10 according to an embodiment may set the inner fibers F1 drawn out from the receptacle body 14 in the first groove G11 to pass through the first wall W1, where the first groove G11 is formed in diagonal with respect to the longitudinal direction of the transceiver 10. This arrangement for the inner fiber F1 makes it possible to incline the axis of the cavity 14p of the optical receptacle with respect to the longitudinal direction of the transceiver 10 as suppressing a stress applied to the fiber F1. The external fiber secured in the optical plug, which is to be inserted into the cavity 14p, may be pulled out along the direction extended from the axis of the cavity 14p, which may narrow a space in front of the face plate of the host system.

The optical transceiver 10 may install the receptacle body 14 inversely; that is, the cavity 14p may head the transmitter side. In such a condition, the inner fiber F1 may be set in the other groove G12 without affecting a surplus stress to the fiber F1.

Figure 14:
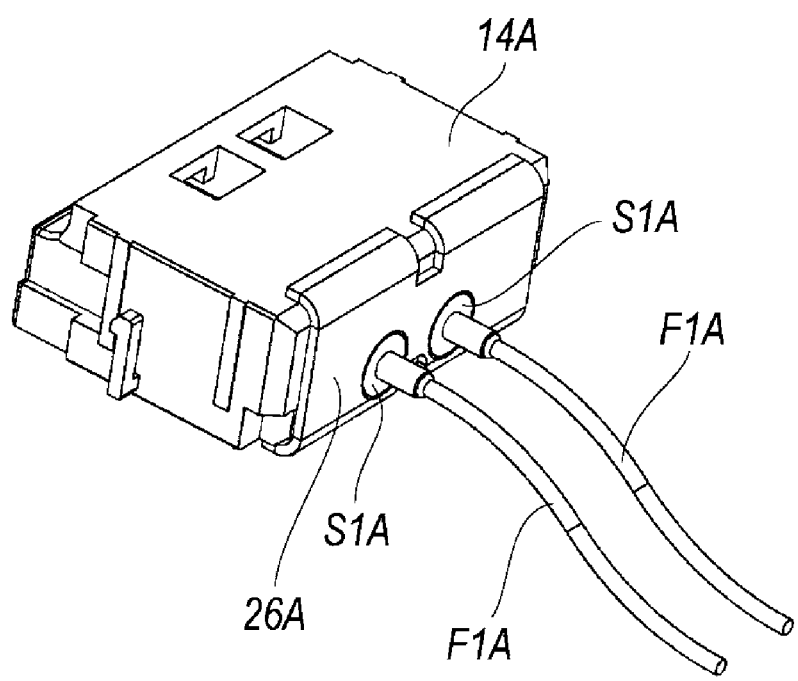
FIG. 14 is a perspective view of a receptacle assembly with an optical receptacle following the standard of the LC-type optical connector.
Figure 15:
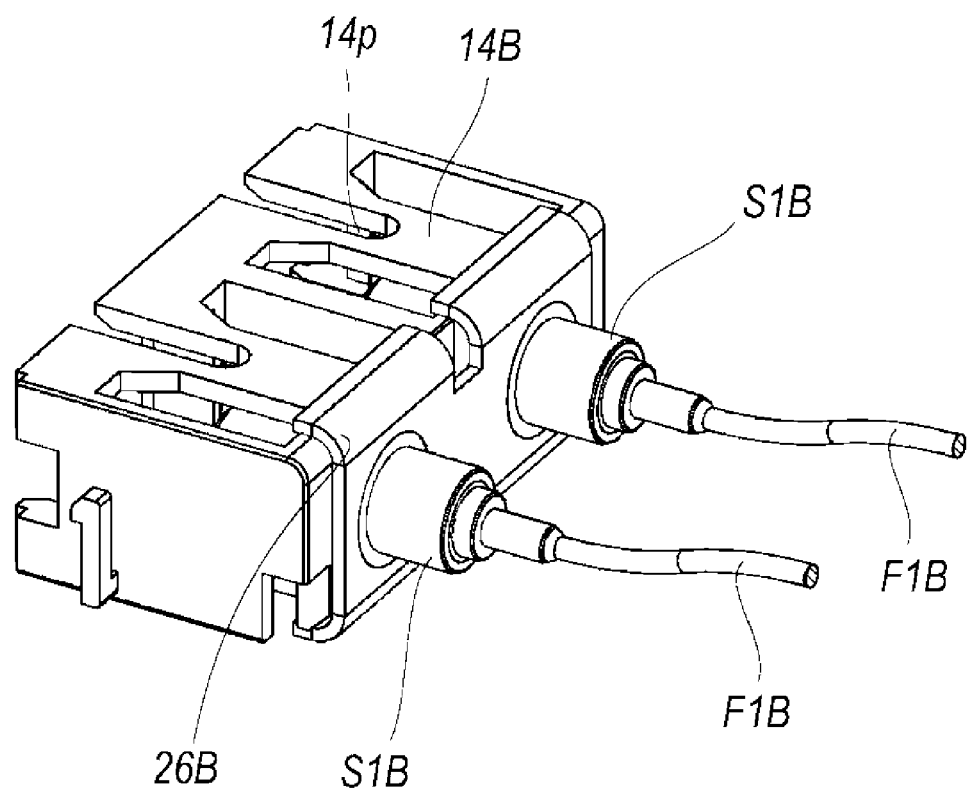
FIG. 15 is a perspective view of another receptacle assembly with an optical receptacle following the standard of the SC-type optical connector.

Also, the optical transceiver 10 may install other types of the receptacle body 14 such as shown in FIGS. 14 and 15, where FIGS. 14 and 15 are perspective views showing other optical receptacles. The receptacle body 14A shown in FIG. 14 is the LC-type receptacle. The inner fibers F1A are drawn out from the sleeve S1A of the receptacle body 14A substantially in parallel to the longitudinal direction of the transceiver 10. Specifically, the inner fibers F1A may be set on the second concavity G22 in the rear wall W11; and guided within the groove G3 in the second area R2 to reach the third area R3. The shield 26A is put between the rear of the receptacle body 14A and the rear wall W11 to shield the first area R1 electrically from the inside of the housing 20.

FIG. 15 is a perspective view showing another type of a receptacle body 14B, which is, what is called, the SC-type optical receptacle.

The sleeve S1B in a tip thereof is set in the cavity 14p, while, a rear portion of the sleeve S1B protrudes from the rear wall of the receptacle body 14B and is set on the first concavity G21 provided in the rear wall W11. The inner fiber F1B extends from the rear end of the sleeve S1B to be set within the groove G3 in the second area R2 to reach the third area R3. The shield 26B is put between the rear end of the receptacle body 14B and the front surface of the rear wall W11.

Thus, the optical transceiver 10 according to an embodiment of the invention may install various types of the optical receptacle. Moreover, one of optical receptacles may be installed such that the axis of the cavity thereof to receive an external optical plug is set in diagonal with respect to the longitudinal direction of the transceiver.

(Second Embodiment)

Figure 16:
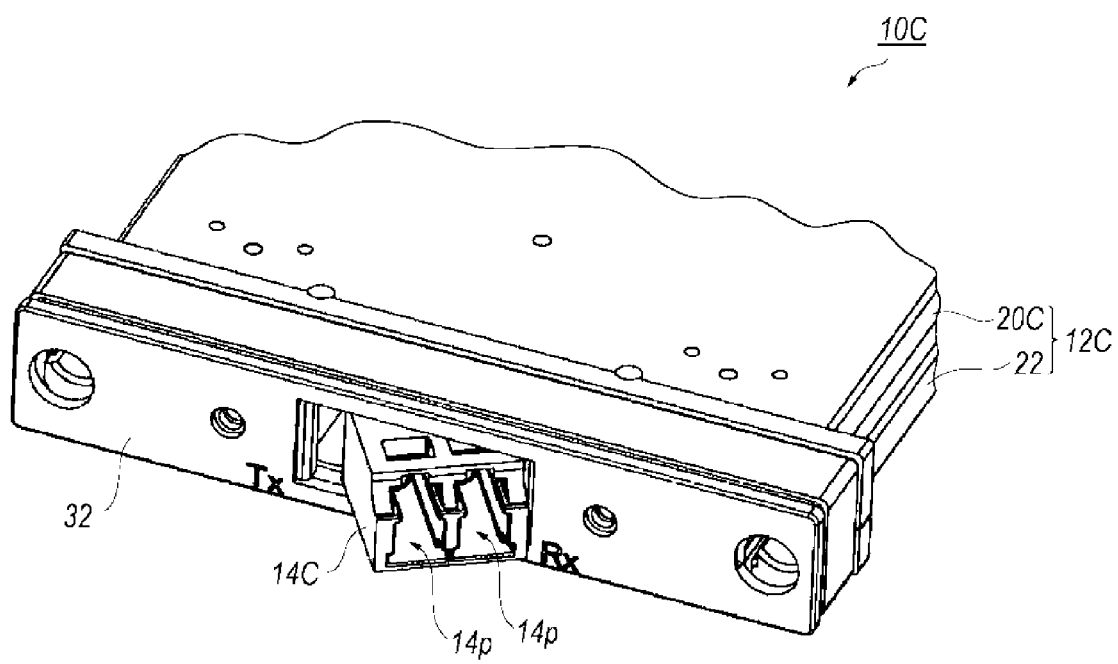
FIG. 16 magnifies a front portion of the optical transceiver according to another embodiment of the invention.
Figure 17:
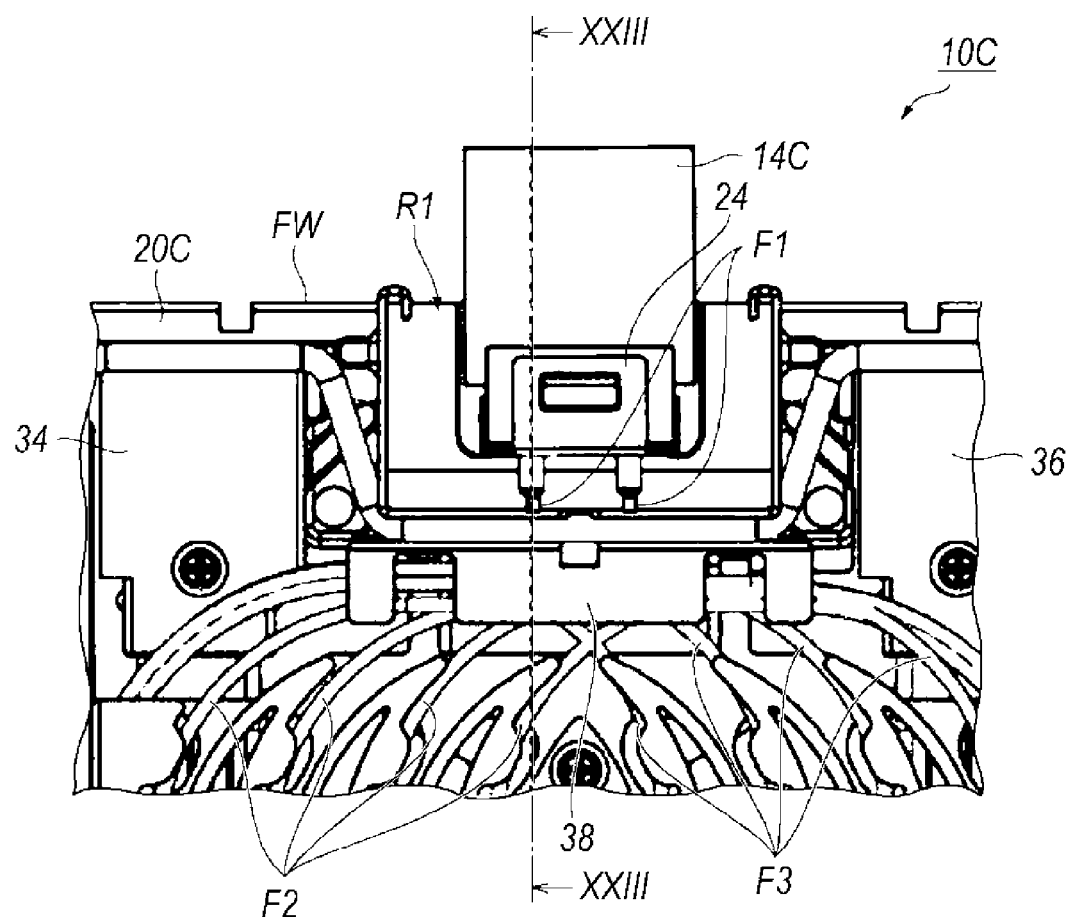
FIG. 17 is a plan view of the front portion of the optical transceiver of the other embodiment shown in FIG. 15 by removing the front cover and the top housing.
Figure 18:
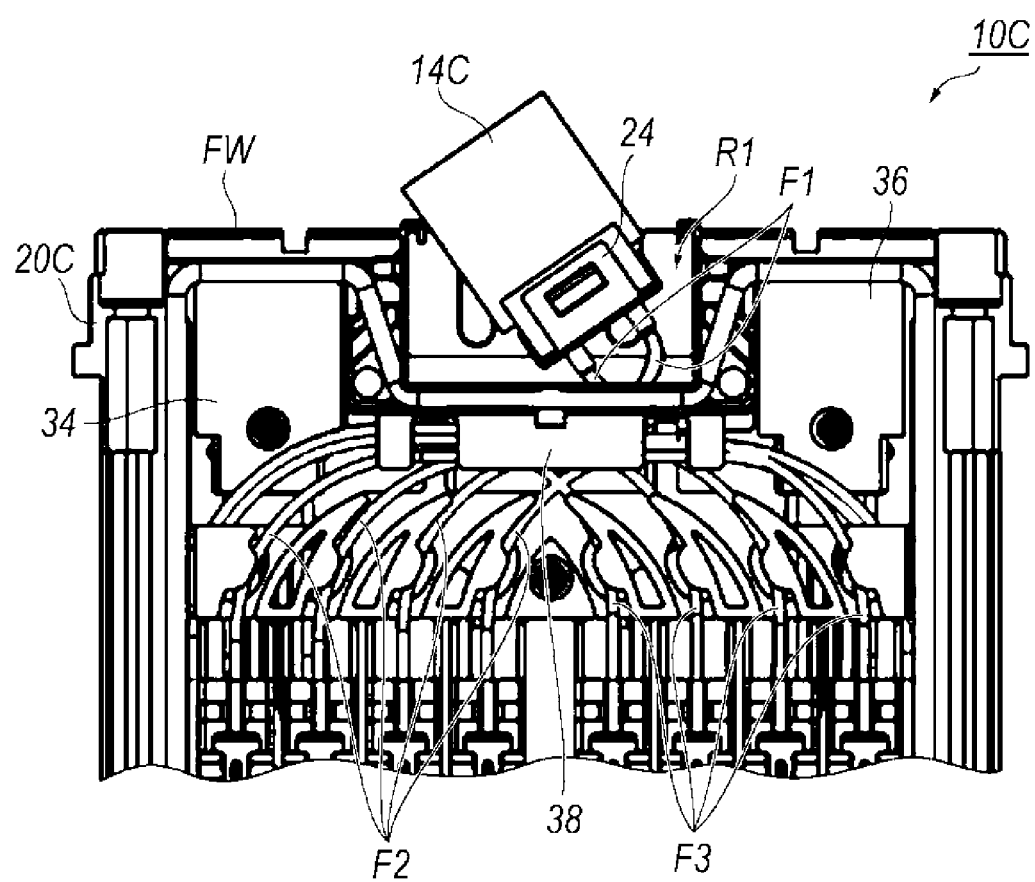
FIG. 18 is a plan view of the front portion of the optical transceiver where the optical receptacle is turned from a position shown in FIG. 16.

Next, another embodiment according to the invention will be described. FIG. 16 magnifies a front end of an optical transceiver 10C according to the other embodiment of the invention; FIG. 17 is a plan view of the front end of the optical transceiver 10C where the front cover 32 and the top housing 22 are removed to show the inside of the transceiver; and FIG. 18 is a plan view of the front end of the transceiver when the receptacle body 14c is rotated from a position shown in FIG. 17. The embodiment thus shown in FIGS. 16 to 18 has a distinguishable feature, compared with the arrangement of the former embodiment, that the transceiver 10C has the receptacle body 14C capable of rotating in the first area R1. Specifically, the optical transceiver 10C may mount the receptacle body 14C such that the cavity thereof heads not only in parallel to the longitudinal direction as shown in FIG. 17 but also in diagonal thereto as shown in FIGS. 16 and 18.

Figure 19:
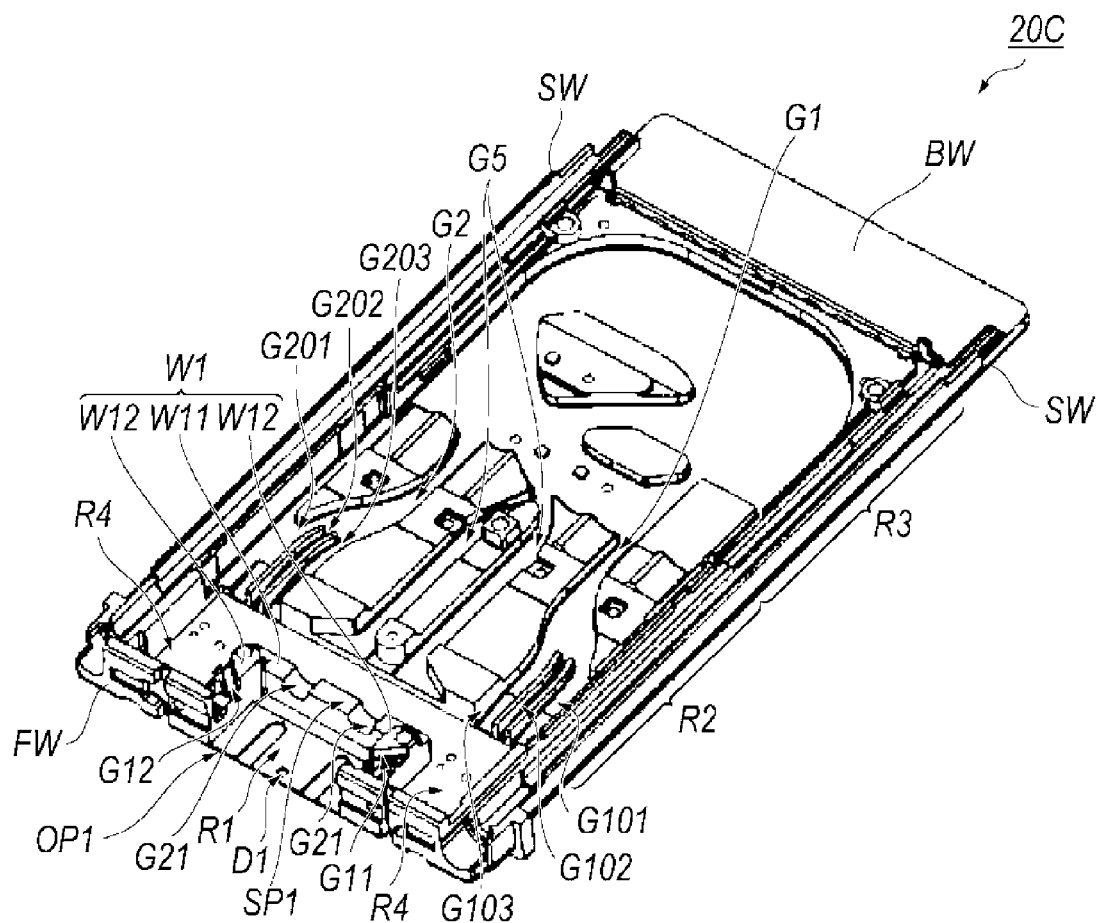
FIG. 19 is a perspective view showing an inside of the bottom housing of the optical transceiver shown in FIGS. 14 to 17.

FIG. 19 is a perspective view showing the inside of the bottom housing 20C of the embodiment. The optical transceiver 10C provides a dent D1 in the bottom BW of the first area R1. In addition, the rear wall W11 has a height less than a height of the side wall W12; that is, the first wall W11 makes a space SP1 above the top thereof when the top housing 22 is assembled with the bottom housing 20C. This space SP1 may connect the first area R1 with the second area R2, or the inside of the housing 12C may be exposed from the space SP1. The inner fiber F1 drawn out from the receptacle body 14C may pass through the space SP1 to reach the second area R2, moreover, because the space SP1 extends laterally, the fiber F1 passing therethrough may be movable in the space SP1.

The second area R2 may provide another groove or slot G5 extending along the longitudinal direction of the optical transceiver instead of grooves, G3 and G4, in the former embodiment shown in FIG. 4. The groove G5 may receive the inner fiber F1 drawn out from the receptacle body 14C. The groove G5 of the present embodiment has a width at the front of the second area R2 with respect to another portion thereof; that is, the groove G5 is flared toward the frontward. This arrangement of the groove G5 may absorb the lateral swing of the inner fiber F1 due to the rotation of the receptacle body 14C.

Figure 20:
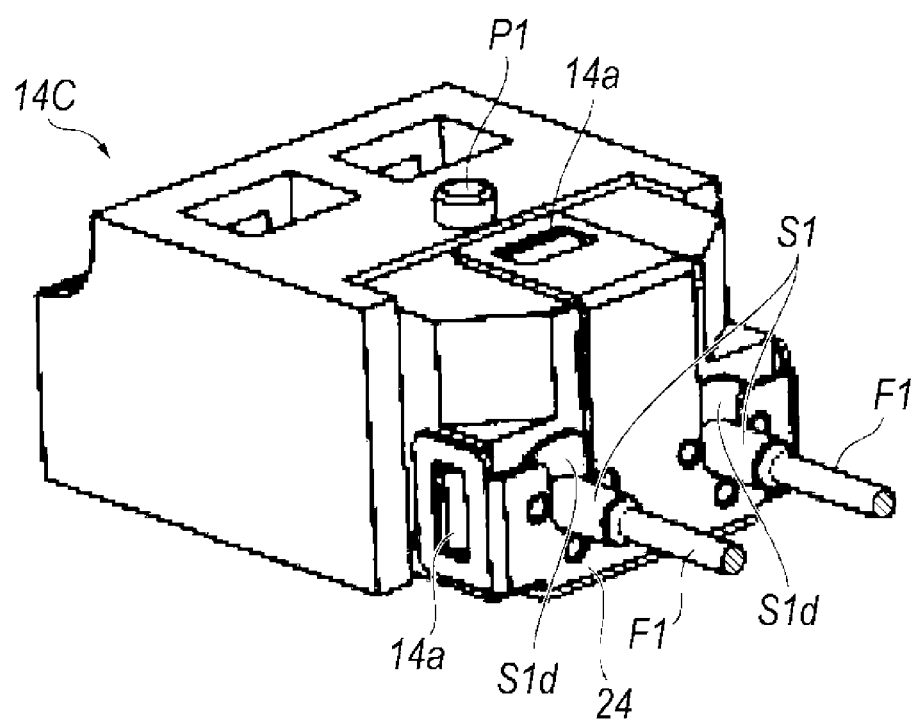
FIG. 20 is a perspective view of a receptacle assembly installed in the optical transceiver shown in FIGS. 14 to 18.

FIG. 20 is a perspective view showing the receptacle body 14C of the present embodiment. The receptacle body 14C provides a projection P1 in a surface thereof, namely, the top surface thereof in the present embodiment. The projection P1, which has a cylindrical cross section, may be inserted into or mated with the dent D1 in the first area R1. Then, the receptacle body 14C may rotate by the projection P1 as an axis and the cavity 14p of the receptacle body 14C may turn in diagonal and/or in parallel to the longitudinal direction of the transceiver.

The receptacle body 14C, same as that in the aforementioned embodiment, may receive the external optical connector in the cavity 14p thereof. The cavity 14p also receives the sleeve S1d from the other opening thereof to couple the external fiber optically with the sleeve S1 therein. The receptacle body 14C also assembles with an attachment 24 as that of the aforementioned receptacle body 14. The attachment 24 may push the sleeve S1d against the receptacle body 14C to secure position of the tip end of the sleeve S1c in the cavity 14p.

Figure 21:
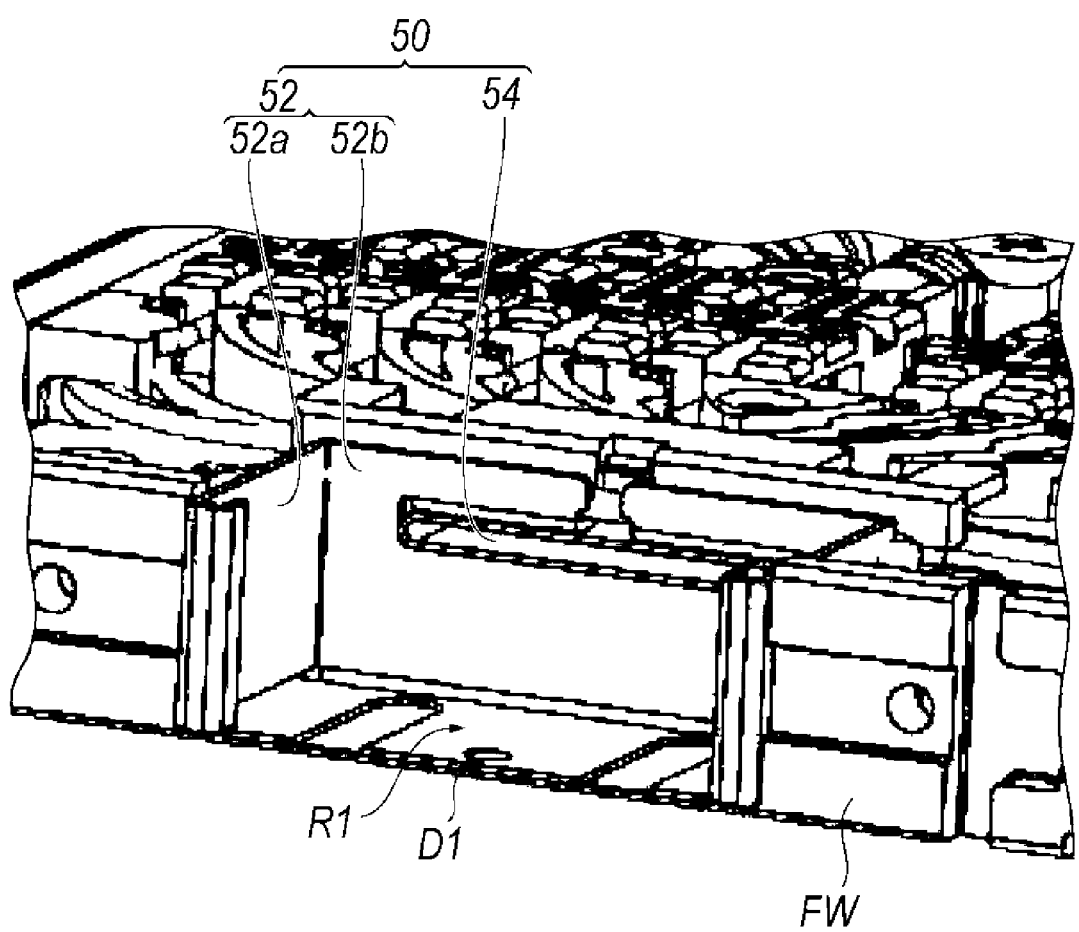
FIG. 21 magnifies a front portion of the optical transceiver where the receptacle assembly shown in FIG. 19 is to be installed thereon.
Figure 22:
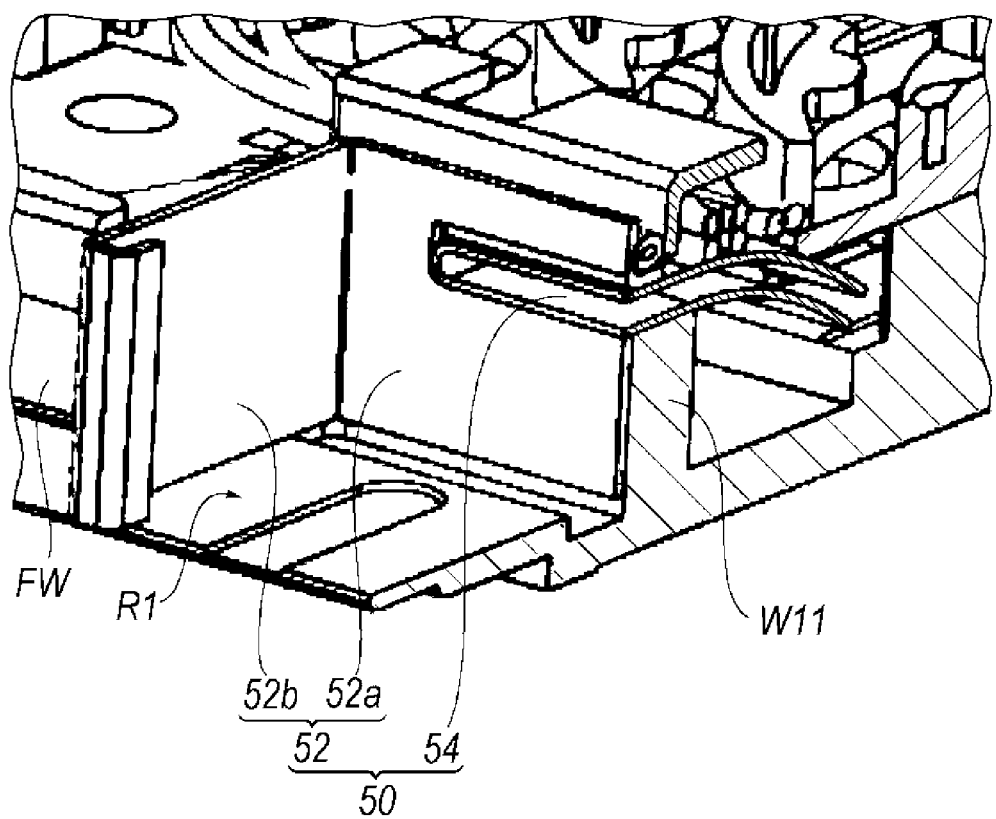
FIG. 22 is a perspective view of the front portion of the optical transceiver shown in FIG. 20, where FIG. 21 partially cut the bottom housing.
Figure 23:
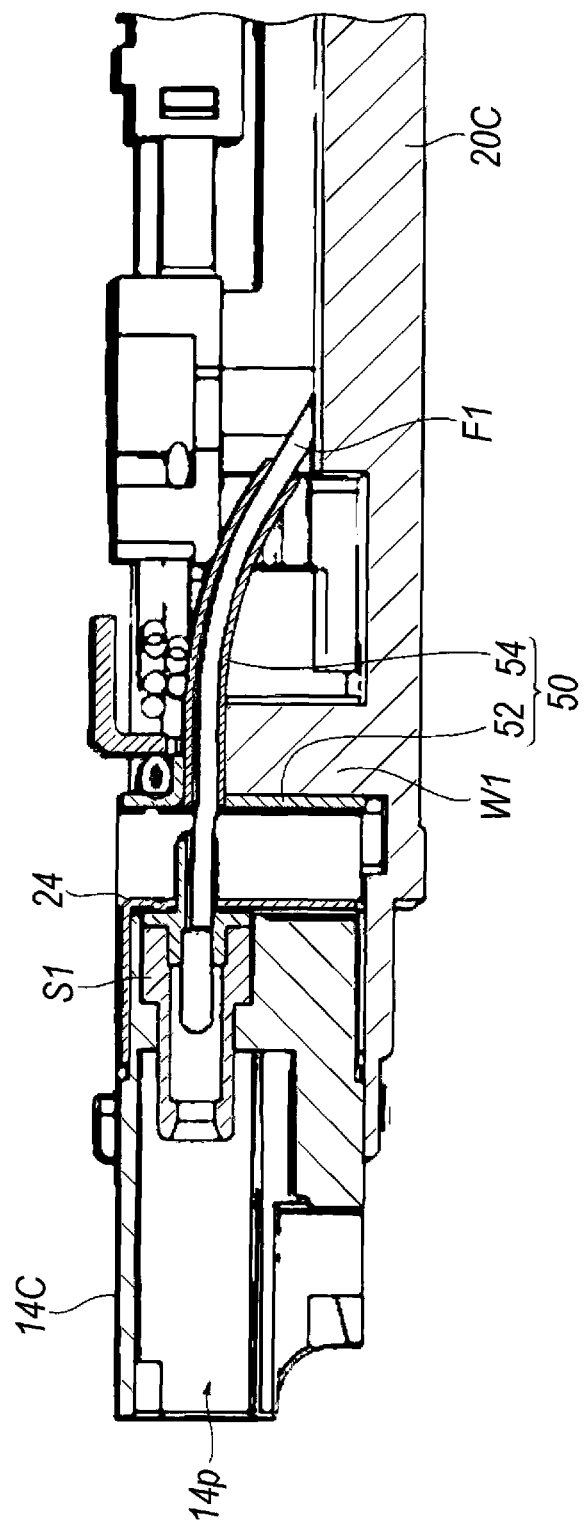
FIG. 23 is shows a cross section taken along the line XXIII-XXIII appeared in FIG. 17.

FIG. 21 magnifies the first area R1 of the optical transceiver according to still another embodiment of the invention; FIG. 22 is a perspective view of the front end of the optical transceiver, where a portion of which is cut to show the cross section thereof; and FIG. 23 is a cross section of the front portion of the optical transceiver taken along the line XIII-XIII appeared in FIG. 17. The optical transceiver 10C may further provide an extra shield 50.

Figure 24:
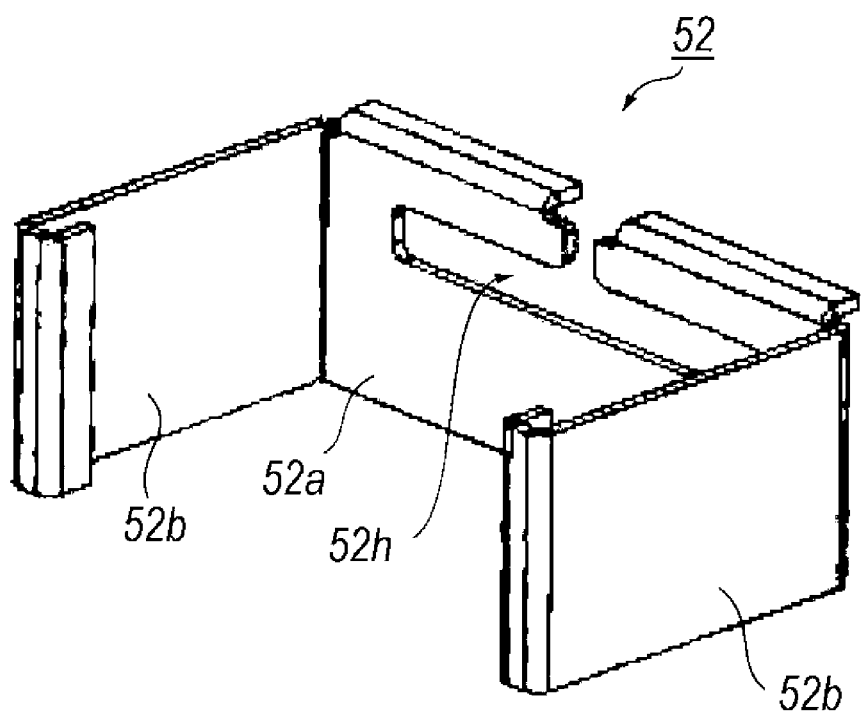
FIG. 24 is a perspective view of a box set on the first area of the front portion of the housing.
Figure 25:
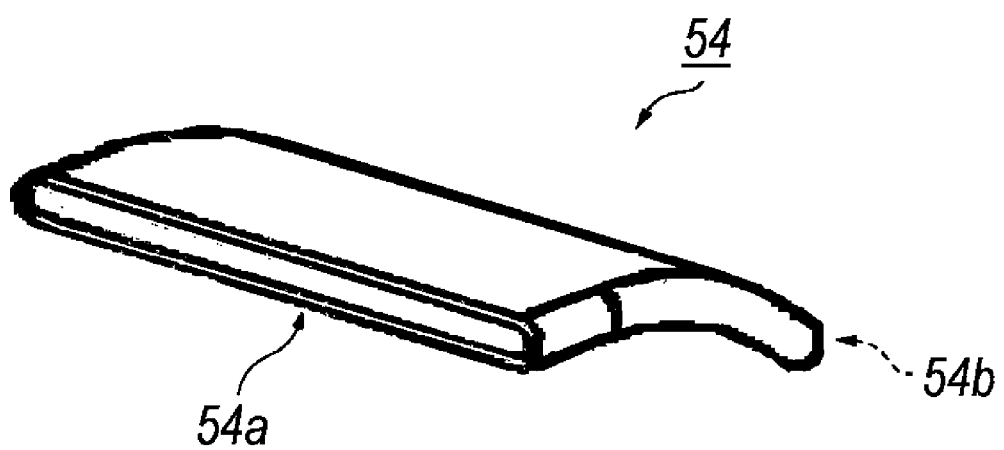
FIG. 25 shows a gasket fit with the aperture of the box.

Referring to FIGS. 24 and 24 in addition to FIGS. 21 to 23, FIG. 24 is a perspective view showing the extra shield 50 and FIG. 25 is a perspective view showing a gasket. The extra shield 50 includes a box 52 and the gasket 54. The box 52, which may be made of metal slab and include a rear 52a and a side 52b, is set in the first area to arrange the rear 52a in parallel to the rear wall W11, while, the side 52b in parallel to the side wall W12, as shown in FIGS. 21 to 23. Thus, the box may cover the grooves, G11 and G12, and the concavities, G21 and G22, formed in the wall W1 to shield the first area R1. Moreover, the box 52 provides a cut 52h aligned with the space SP1 of the rear wall W11.

The gasket 54, which may be also made of metal, has a tubular shape with an aperture extending from the front end 54a to the rear end 54b. The front end 54a may be fit within the cut 52h and the gasket 54 extends from the rear end of the first area R1 to the second area R2 passing through the space SP1. The inner fiber F1 may pass through the cavity of the gasket 54. As shown in FIG. 25, the gasket 54 slightly warps to reduce electro-magnetic radiation from leaking from one end to the other.

Thus, the optical transceiver 10C according to an embodiment of the invention, the receptacle body 14C may turn in the first area R1 to pull the external optical fiber inserted in the receptacle body 14C in a direction not only in parallel but diagonal to the longitudinal direction of the optical transceiver 10C, which may narrow the space just in front of the face panel of the host system.

While there has been illustrated and described what are presently considered to be example embodiments of the present invention, it will be understood by those skilled in the art that various other modifications may be made, and equivalents may be substituted, without departing from the true scope of the invention. For instance, the optical transceiver 10C provides the dent D1 in the bottom housing 20C and the projection P1 in the receptacle body 14C, but the bottom housing 20C may provide a projection while the receptacle body 14C may form a dent fit to the projection.

Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. An optical transceiver, comprising:
   an optical receptacle for receiving an optical connector therein;
   an optical subassembly for performing conversion between an electrical signal and an optical signal, the optical subassembly being optically coupled with the optical receptacle by an inner fiber;
   an electronic circuit electrically coupled with the optical subassembly; and
   a housing for enclosing the optical receptacle, the inner fiber, the optical subassembly and the electronic circuit, the housing having a longitudinal axis and including a first area, a second area, and a third area, along the longitudinal axis of the housing, the first to third areas installing the optical receptacle, the optical subassembly and the electronic circuit, respectively,
   wherein the optical receptacle has a cavity into which the optical connector is to be received, the cavity having an axis extending in diagonal to the longitudinal axis of the housing,
   wherein the first area is surrounded by a rear wall and a pair of side walls having a groove to set an inner fiber connecting the optical receptacle with the optical subassembly, the groove extending in parallel to the axis of the cavity of the optical receptacle.

2. The optical transceiver of claim 1,
   wherein the optical receptacle has a rear surface facing the rear wall of the first area, and the rear surface and the rear wall put a shield therebetween.

3. The optical transceiver of claim 1,
   wherein the optical transceiver includes:
   a plurality of transmitter optical subassemblies (TOSAs) and a plurality of receiver optical subassemblies (ROSAs) as the optical subassembly, the TOSAs each processing a specific optical signal whose wavelength different from others, the ROSAs each processing a specific optical signal whose wavelength different from others;
   an optical multiplexer to multiplex optical signals coming from the TOSAs;
   an optical de-multiplexer to de-multiplex an optical signal into optical signals provided to the respective ROSAs;
   a pair of inner fibers, one of inner fibers connecting the optical receptacle with the optical multiplexer, and another of inner fibers connecting the optical receptacle with the optical de-multiplexer;
   a plurality of transmitter fibers each connecting the optical multiplexer with a respective one of the TOSAs; and
   a plurality of receiver fibers each connecting the optical de-multiplexer with a respective one of the ROSAs.

4. The optical transceiver of claim 3,
   wherein the transmitter fibers each has an inner connector to be coupled with a respective one of the TOSAs, and the receiver fibers each has an inner connector to be coupled with a respective one of the ROSAs.

5. The optical transceiver of claim 1,
   wherein the inner fiber includes a sleeve in a tip thereof, the sleeve being inserted into the cavity of the optical receptacle, and
   wherein the optical receptacle assembles with an attachment to fasten the sleeve to the optical receptacle.

6. The optical transceiver of claim 1,
   wherein the optical receptacle is made of resin and has a polygonal plane shape.

7. An optical transceiver, comprising:
   an optical receptacle for receiving an optical connector therein;
   an optical subassembly for performing conversion between an electrical signal and an optical signal, the optical subassembly being optically coupled with the optical receptacle by an inner fiber;
   an electronic circuit electrically coupled with the optical subassembly; and
   a housing for enclosing the optical receptacle, the inner fiber, the optical subassembly and the electronic circuit, the housing having a longitudinal axis, the housing including a first area, a second area, and a third area arranged along the longitudinal axis of the housing for installing the optical receptacle, the optical subassembly and the electronic circuit, respectively,
   wherein the first area provides a metal box having a rear wall with an aperture through which the inner fiber passes to couple the optical receptacle optically with the optical subassembly, and
   wherein the optical receptacle is capable of turning by an axis perpendicular to the longitudinal axis of the housing.

8. The optical transceiver of claim 7,
   further including a gasket fit with the aperture to pass the inner fiber therethrough.

9. The optical transceiver of claim 7,
   wherein the inner fiber is drawn from the optical receptacle, passing through the aperture, drawn along a side of the housing in the second area to the third area, rounded in the third area, inversely drawn to the second area from the third area along another side in the second area, and rounded in the second area to reach the optical subassembly mounted in the second area.

10. The optical transceiver of claim 7,
    wherein the housing provides a groove in the second area to set the inner fiber drawn out from the optical receptacle therein, and
    wherein the groove is flared toward the first area.

11. The optical transceiver of claim 7,
    wherein the optical transceiver includes:
    a plurality of transmitter optical subassemblies (TOSAs) and a plurality of receiver optical subassemblies (ROSAs), the TOSAs each processing a specific optical signal whose wavelength different from others, the ROSAs each processing a specific optical signal whose wavelength different from others;
    an optical multiplexer to multiplex optical signals coming from the TOSAs;
    an optical de-multiplexer to de-multiplex an optical signal into optical signals provided to the respective ROSAs;
    a pair of inner fibers, one of inner fibers connecting the optical receptacle with the optical multiplexer, and another of inner fibers connecting the optical receptacle with the optical de-multiplexer;
    a plurality of transmitter fibers each connecting the optical multiplexer with a respective one of the TOSAs; and a plurality of receiver fibers each connecting the optical de-multiplexer with a respective one of the ROSAs.

12. The optical transceiver of claim 11,
wherein the transmitter fibers each has an inner connector to be coupled with a respective one of the TOSAs, and the receiver fibers each has an inner connector to be coupled with a respective one of the ROSAs.

13. The optical transceiver of claim 7,
wherein the inner fiber includes a sleeve in a tip thereof, the sleeve being inserted into the cavity,
wherein the optical receptacle assembles with an attachment to fasten the sleeve to the optical receptacle.

14. The optical transceiver of claim 7,
wherein the optical receptacle is made of resin and has a polygonal plane shape.

* * * * *